United States Patent
Islam et al.

(10) Patent No.: US 11,071,136 B2
(45) Date of Patent: Jul. 20, 2021

(54) SYSTEM AND METHOD FOR MULTIPLEXING TRAFFIC

(71) Applicant: Huawei Technologies Co., Ltd., Shenzhen (CN)

(72) Inventors: Toufiqul Islam, Ottawa (CA); Peng Zhang, Shanghai (CN); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/640,404

(22) Filed: Jun. 30, 2017

(65) Prior Publication Data

US 2018/0063865 A1    Mar. 1, 2018

Related U.S. Application Data

(60) Provisional application No. 62/379,559, filed on Aug. 25, 2016, provisional application No. 62/435,019, filed on Dec. 15, 2016.

(51) Int. Cl.
*H04W 72/14* (2009.01)
*H04L 5/00* (2006.01)
(Continued)

(52) U.S. Cl.
CPC ........... *H04W 72/14* (2013.01); *H04L 5/0064* (2013.01); *H04L 5/0087* (2013.01);
(Continued)

(58) Field of Classification Search
CPC ............ H04W 52/325; H04W 72/042; H04W 72/1226; H04W 72/14; H04W 72/044;
(Continued)

(56) References Cited

U.S. PATENT DOCUMENTS 10,334,589 B2   6/2019   Stephenne et al.
10,368,345 B2   7/2019   Sun et al.
(Continued)

FOREIGN PATENT DOCUMENTS

CN   101212762 A   7/2008
CN   101459965 A   6/2009
(Continued)

OTHER PUBLICATIONS

Samsung, "Discussion on URLLC support in NR", 3GPP TSG RAN WG1 Meeting #86, R1-166759, Aug. 22-26, 2016, 5 Pages, Gothenburg, Sweden.
(Continued)

*Primary Examiner* — Benjamin H Elliott IV
*Assistant Examiner* — Prince A Mensah
(74) *Attorney, Agent, or Firm* — Slater Matsil, LLP

(57) ABSTRACT

A system and method for multiplexing traffic. A wireless device such as a base station may schedule a first transmission of first data (e.g., latency tolerant data) to a first UE on first resources, and transmit second data (e.g., low latency data) to a second UE on a portion of the first resources. The base station may signal a first indicator e.g. via Radio Resource Control (RRC) signaling to the first UE indicating that the first UE is to monitor for a second indicator that itself indicates the presence of second data on the first resources. The base station may then signal a second indicator to the first UE to indicate the presence of the second data on the first resources. By using the first indicator to initiate the monitoring of the second indicator, the first UE can reduce the amount of monitoring it needs to perform if there is no second data traffic in a certain period of time or in a certain frequency band.

42 Claims, 18 Drawing Sheets

(51) Int. Cl.
  *H04W 72/12* (2009.01)
  *H04W 76/27* (2018.01)
  *H04W 72/04* (2009.01)
  *H04W 88/02* (2009.01)
  *H04W 88/08* (2009.01)

(52) U.S. Cl.
  CPC ......... *H04L 5/0091* (2013.01); *H04W 72/044* (2013.01); *H04W 72/1289* (2013.01); *H04W 76/27* (2018.02); *H04L 5/0007* (2013.01); *H04L 5/0044* (2013.01); *H04W 72/1242* (2013.01); *H04W 72/1273* (2013.01); *H04W 88/02* (2013.01); *H04W 88/08* (2013.01)

(58) Field of Classification Search
  CPC ......... H04W 72/1242; H04W 72/1273; H04W 72/1289; H04W 76/27; H04W 88/02; H04W 88/08; H04L 5/0007; H04L 5/0044; H04L 5/0064; H04L 5/0087; H04L 5/0091
  See application file for complete search history.

(56) References Cited

U.S. PATENT DOCUMENTS

| | | | |
|---|---|---|---|
| 2004/0062273 | A1 | 4/2004 | Frank et al. |
| 2005/0071471 | A1 | 3/2005 | Saenz, III |
| 2008/0313521 | A1 | 12/2008 | Frederiksen et al. |
| 2009/0262699 | A1 | 10/2009 | Wengerter et al. |
| 2010/0074200 | A1 | 3/2010 | Li et al. |
| 2012/0329400 | A1 | 12/2012 | Seo et al. |
| 2013/0083753 | A1 | 4/2013 | Lee et al. |
| 2013/0163537 | A1 | 6/2013 | Anderson et al. |
| 2013/0324117 | A1 | 12/2013 | Kim et al. |
| 2014/0086197 | A1 | 3/2014 | Yang et al. |
| 2014/0146689 | A1 | 5/2014 | Gaur et al. |
| 2014/0258815 | A1 | 9/2014 | Jeong et al. |
| 2014/0325321 | A1 | 10/2014 | Rafique et al. |
| 2014/0369247 | A1 | 12/2014 | Sambhwani et al. |
| 2015/0023145 | A1 | 1/2015 | Kim et al. |
| 2015/0181570 | A1 | 6/2015 | Sorrentino et al. |
| 2015/0230211 | A1 | 8/2015 | You et al. |
| 2015/0256486 | A1 | 9/2015 | Boucard et al. |
| 2015/0326369 | A1 | 11/2015 | Kim et al. |
| 2015/0334685 | A1 | 11/2015 | Ji et al. |
| 2015/0334709 | A1 | 11/2015 | Ji et al. |
| 2016/0057768 | A1 | 2/2016 | Sun et al. |
| 2016/0066316 | A1 | 3/2016 | Bhushan et al. |
| 2016/0127094 | A1 | 5/2016 | Jiang et al. |
| 2016/0128045 | A1 | 5/2016 | Azarian Yazdi et al. |
| 2016/0198350 | A1 | 7/2016 | Lou et al. |
| 2016/0234857 | A1* | 8/2016 | Chen ................ H04W 72/1231 |
| 2016/0309466 | A1 | 10/2016 | Chen et al. |
| 2016/0309518 | A1 | 10/2016 | Patel et al. |
| 2016/0352551 | A1 | 12/2016 | Zhang et al. |
| 2016/0381490 | A1 | 12/2016 | Rico Alvarino et al. |
| 2017/0111886 | A1* | 4/2017 | Kim ..................... H04W 72/042 |
| 2017/0257860 | A1* | 9/2017 | Nam ................... H04L 27/2602 |
| 2017/0289964 | A1 | 10/2017 | Lin et al. |
| 2017/0366311 | A1 | 12/2017 | Iyer et al. |
| 2017/0367003 | A1 | 12/2017 | Zhang et al. |
| 2018/0041858 | A1* | 2/2018 | Sheng .................. H04L 1/0009 |
| 2018/0049166 | A1* | 2/2018 | Sun ..................... H04W 72/042 |
| 2018/0049189 | A1 | 2/2018 | Hugl et al. |
| 2018/0049197 | A1* | 2/2018 | Patel ......................... H04J 1/00 |
| 2018/0049272 | A1 | 2/2018 | Bagheri et al. |
| 2018/0199341 | A1 | 7/2018 | Baldemair et al. |
| 2018/0249486 | A1 | 8/2018 | Hosseini et al. |
| 2018/0255543 | A1 | 9/2018 | Takeda et al. |
| 2018/0279347 | A1 | 9/2018 | Wang et al. |
| 2018/0287739 | A1 | 10/2018 | Kim et al. |
| 2018/0302900 | A1 | 10/2018 | Ibars Casas et al. |
| 2018/0337763 | A1 | 11/2018 | Shi et al. |
| 2018/0367263 | A1 | 12/2018 | Ying et al. |
| 2018/0376495 | A1 | 12/2018 | Lee et al. |
| 2019/0007181 | A1 | 1/2019 | Marinier et al. |
| 2019/0115997 | A1 | 4/2019 | Chen et al. |
| 2019/0165906 | A1 | 5/2019 | Bala et al. |
| 2019/0173623 | A1 | 6/2019 | Khosravirad et al. |
| 2019/0190675 | A1 | 6/2019 | Takeda et al. |
| 2019/0223050 | A1 | 7/2019 | Wikstrom et al. |
| 2019/0261383 | A1 | 8/2019 | Kwak et al. |
| 2019/0268096 | A1 | 8/2019 | Takeda et al. |
| 2019/0268107 | A1 | 8/2019 | Yasukawa et al. |
| 2019/0319750 | A1 | 10/2019 | Khosravirad et al. |
| 2019/0372742 | A1 | 12/2019 | Lee et al. |
| 2020/0015248 | A1 | 1/2020 | Ji et al. |
| 2020/0037305 | A1 | 1/2020 | Yang et al. |

FOREIGN PATENT DOCUMENTS

| | | |
|---|---|---|
| CN | 101986619 A | 3/2011 |
| CN | 104113937 A | 10/2014 |
| CN | 104284424 A | 1/2015 |
| EP | 2214340 A1 | 8/2010 |
| JP | 2012503349 A | 2/2012 |
| JP | 2014107868 A | 6/2014 |
| JP | 2017519421 A | 7/2017 |
| JP | 2017530653 A | 10/2017 |
| WO | 2008154646 A2 | 12/2008 |
| WO | 2010012156 A1 | 2/2010 |
| WO | 2015003057 A3 | 3/2015 |
| WO | 2015179136 A1 | 11/2015 |
| WO | 2015179145 A1 | 11/2015 |
| WO | 2016036492 A1 | 3/2016 |
| WO | 2016040290 A1 | 3/2016 |
| WO | 2016126398 A1 | 8/2016 |

OTHER PUBLICATIONS

LG Electronics, "Discussion on alignment for different numerology multiplexing", 3GPP TSG RAN WG1 Meeting #86, R1-166878, Aug. 2016, 5 Pages.

LG Electronics, "Discussion on relay operation in NR", 3GPP TSG RAN WG1 Meeting #86, R1-166887, Aug. 2016, 4 Pages.

Nokia et al., "Punctured Scheduling for Low Latency Transmissions", 3GPP TSG-RAN WG1 #85, R1-165381, May 2016, 4 Pages.

Nokia et al., "Punctured Scheduling for Low Latency Transmissions", 3GPP TSG-RAN-WG1 #86, R1-167308, Aug. 2016, 4 Pages.

Qualcomm et al., "WF on Scalable Numerology Symbol Boundary Alignment", 3GPP TSG RAN WG1 #85, R1-165583, May 2016, 6 Pages.

Samsung, "Discussion on symbol alignment across scaled numerology", 3GPP TSG RAN WG1 #86, R1-166753, Aug. 2016, 4 Pages.

ZTE et al., "Unified Synchronization Structure", 3GPP TSG RAN WG1 Meeting #86, R1-166422, Aug. 22-26, 2016, 6 Pages, Gothenburg, Sweden.

Caban, S., et al., "Evaluation of HSDPA and LTE, From Testbed Measurements to System Level Performance", Wiley, A John Wiley & Sons, Ltd. Publication, Jan. 1, 2012, 4 Pages.

Rumney, M., "LTE and the Evolution to 4G Wireless, Design and Measurement Challenges", Second Edition, Wiley, Agilent Technologies, Jan. 2013, 4 Pages.

Huawei et al., "Consideration on multiplexing of non-sTTI and sTTI in the same carrier", 3GPP TSG RAN WG1 Meeting #84bis, R1-162590, Apr. 11-15, 2016 5 Pages, Busan, Korea.

Huawei et al., "Discussion on sTTI scheduling", 3GPP TSG RAN WG1 Meeting #88, R1-1701733, Feb. 13-17, 2017, 9 Pages, Athens Greece.

Intel Corporation, "Downlink URLLC transmission on multiplexing with eMBB", 3GPP TSG RAN WG1 Meeting #87, R1-1612003, Nov. 14-18, 2016, 10 Pages, Reno, USA.

Samsung, "Collision handling of sTTI and TTI in UL", 3GPP TSG RAN WG1 Meeting #89, R1-1707886, May 15-19, 2017, 4 Pages, Hangzhou, P.R. China.

(56) References Cited

OTHER PUBLICATIONS

Huawei, et al., "On pre-emption indication for DL multiplexing of URLLC and eMBB", 3GPP TSG RAN WG1 Meeting #88bis, R1-1704215, Apr. 3-7, 2017, 5 Pages, Spokane, USA.
Alcatel-Lucent, "UL grant and Ue behaviour", 3GPP TSG RAN WG2 #60, R2-074891, Nov. 5-9, 2007, 4 Pages, Joju, Korea.

* cited by examiner

US 11,071,136 B2

SYSTEM AND METHOD FOR MULTIPLEXING TRAFFIC

This patent application claims priority to U.S. Provisional Application No. 62/435,019, filed on Dec. 15, 2016 and entitled "System and Method for Multiplexing Traffic," and U.S. Provisional Application No. 62/379,559, filed on Aug. 25, 2016 and entitled "Co-existence of Low Latency and Latency Tolerant Downlink Communication," which are hereby incorporated by reference herein as if reproduced in its entirety.

TECHNICAL FIELD

The present invention relates generally to a system and method for wireless communications, and, in particular embodiments, to a system and method for multiplexing of low latency and latency tolerant communications.

BACKGROUND

In some wireless communication systems, a user equipment (UE) wirelessly communicates with one or more base stations. A wireless communication from a UE to a base station is referred to as an uplink communication. A wireless communication from a base station to a UE is referred to as a downlink communication. Resources are required to perform uplink and downlink communications. For example, a base station or a group of base stations may wirelessly transmit data to a UE in a downlink communication at a particular frequency for a particular duration of time. The frequency and time duration are examples of resources.

A base station allocates resources for downlink communications to the UEs served by the base station. The wireless communications may be performed by transmitting orthogonal frequency-division multiplexing (OFDM) symbols.

Some UEs served by a base station may need to receive data from the base station with lower latency than other UEs served by the base station. For example, a base station may serve multiple UEs, including a first UE and a second UE. The first UE may be a mobile device carried by a human who is using the first UE to browse on the Internet. The second UE may be equipment on an autonomous vehicle driving on a highway. Although the base station is serving both UEs, the second UE may need to receive data with lower latency compared to the first UE. The second UE may also need to receive its data with higher reliability than the first UE. The second UE may be an ultra-reliable low latency communication (URLLC) UE, whereas the first UE may be an enhanced mobile broadband (eMBB) UE.

UEs that are served by a base station and that require lower latency downlink communication will be referred to as "low latency UEs". The other UEs served by the base station will be referred to as a "latency tolerant UEs". Data to be transmitted from the base station to a low latency UE will be referred to as "low latency data", and data to be transmitted from the base station to a latency tolerant UE will be referred to as "latency tolerant data".

SUMMARY

Technical advantages are generally achieved by embodiments of this disclosure which describe a system and method for multiplexing traffic.

In accordance with an embodiment of the present invention, a method for multiplexing traffic is provided, as may be performed by a base station. In this example, the method includes scheduling a first transmission of first data to a first user equipment (UE) on first resources, and transmitting second data to a second UE on at least a portion of the first resources. The method further includes signaling a first indicator to the first UE indicating the first UE is to monitor for a second indicator, where the second indicator indicates the presence of the second data on the first resources and signaling a second indicator to the first UE indicating the presence of the second data on the first resources. An apparatus for performing this method is also provided.

In the above base station method embodiment, the method may further include signaling another first indicator to the first UE to indicate that the first UE is not to monitor for a second indicator when no second data is to be transmitted on the first resources.

A base station (BS) configured for wireless communications with a first user equipment (UE) and that is configured for wireless communications may include a non-transitory memory storage comprising instructions, and one or more processors in communication with the memory, wherein the one or more processors execute the instructions to perform any of the BS method embodiments described above.

In accordance with another embodiment of the present invention, a method for resource allocation in a wireless communications system is provided, as may be performed by a first user equipment (UE). In this example, the method includes receiving scheduling information from a base station (BS) for a first transmission of first data on first resources, and receiving a first indicator from the BS indicating that the first UE is to monitor for a second indicator that indicates the presence of second data on the first resources transmitted to a second UE on at least a portion of the first resources. The method further includes receiving a second indicator from the BS that indicates the presence of second data on the first resources and decoding the first transmission based on the scheduling information and the second indicator.

In the above UE method embodiment, the method may further include monitoring for a second indicator. In any of the above UE method embodiments, the method may further include receiving another first indicator from the BS where the other first indicator indicates that the first UE is not to monitor for a second indicator when no second data is to be transmitted on the first resources. In any of the above UE method embodiments, the second data may be received from the BS on a portion of the first resources where at least one of the portion of the first transmission is punctured to transmit the second data, or the portion of the first transmission has a reduced power to allow for the transmission of the second data.

A first user equipment (UE) configured for wireless communications may include a non-transitory memory storage comprising instructions, and one or more processors in communication with the memory, wherein the one or more processors execute the instructions to perform any of the UE method embodiments described above.

In any of the above base station and UE embodiments, one or more of the following options (in any combination) are possible. The first indicator may be signaled via Radio Resource Control (RRC) signaling. The first transmission may be scheduled in a coexistence region available for transmission of first and second data. The second indicator may be received from the BS in a unicast transmission, a multicast transmission or a broadcast transmission. The second indicator may indicate the portion of the first resources used to transmit the second data or a portion of the first transmission where the second data is present. The portion of the first transmission may include one or more of a code block (CB), a transport block (TB), a group of CBs, or a group of TBs. The portion of the first resources may include one or more of a time resource, a transmission time unit (TTU), a transmission time interval (TTI), a symbol, a frame, a sub-frame, a slot, a mini-slot, a frequency resource, a resource block (RB), or a resource block group (RBG) of the first resources. The second indicator may include a bit indicating the presence of the second data on the portion of the first resources or the portion of the first transmission where the second data is present. The second indicator may include a plurality of bits indicating the presence of the second data on the portion of the first resources or the portion of the first transmission where the second data is present. Each of the plurality of bits may indicate the presence or absence of the second data on a respective resource of the first resources or on a respective portion of the first transmission. The plurality of bits may correspond to at least one of a respective plurality of time resources, a respective plurality of frequency resources or a respective plurality of time-frequency resources of the portion of the first resources. The plurality of bits may correspond to at least one of a respective plurality of CBs or a respective plurality of TBs of the first transmission. The second indicator may be one of an explicit indication and an implicit indication. The second indicator may be transmitted on the first resources or outside the first resources.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
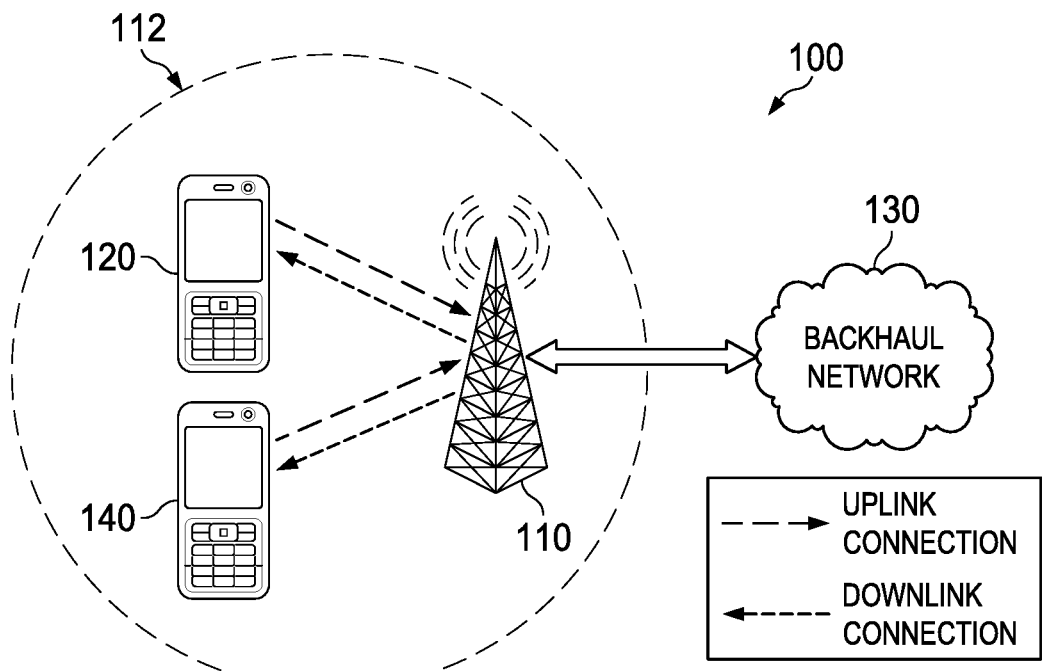
FIG. 1 illustrates a network for communicating data.

FIG. 1 illustrates a network 100 for communicating data. The network 100 comprises a base station 110 having a coverage area 112, a plurality of mobile devices 120 and 140 and a backhaul network 130. As shown, the base station 110 establishes uplink (dashed line) and/or downlink (dotted line) connections with the mobile devices 120 and 140 which serve to carry data from the mobile devices 120 and 140 to the base station 110 and vice-versa. Data carried over the uplink/downlink connections may include data communicated between the mobile devices 120 and 140, as well as data communicated to/from a remote-end (not shown) by way of the backhaul network 130. As used herein, the term "base station" refers to any component (or collection of components) configured to provide wireless access to a network, such as an enhanced Node B (eNB), gNodeB (gNB), a macro-cell, a femtocell, a Wi-Fi access point (AP), or other wirelessly enabled devices. The terms "eNB", "gNB", and "base station" are used interchangeably throughout this disclosure. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

The UE 120 may be a low latency UE, and the UE 140 may be a latency tolerant UE. That is, UE 120 may require lower latency downlink communication compared to UE 140. For example, UE 120 may be a URLLC UE, and UE 140 may be an eMBB UE. It should be understood that references to URLLC and eMBB in this disclosure are only examples of low latency traffic and latency tolerant traffic, and that the methods described herein are equally applicable to any two traffic types having different latency requirements. Some examples include low latency traffic not requiring high reliability, latency tolerant traffic with less stringent reliability requirement. Additional examples include traffic intended for different UEs with the same or different latency requirements. Some use cases also include massive machine type communication (mMTC) and/or narrowband Internet of things (NB-IoT). The multiplexing schemes discussed in the invention may also relate to the examples mentioned above, wherever applicable. Although the base station 110 only serves two UEs in FIG. 1, in actual operation the base station 110 may serve many more UEs. It is also contemplated that a single UE 120, 140 may be served by more than one base station 110. Downlink transmissions to the latency tolerant UEs are typically grant-based, but may be grant-free. Also, downlink transmissions to the low latency UEs may be grant-based or grant-free.

When the base station 110 has data to transmit to UEs 120 and/or 140 the base station 110 transmits this data in one or more downlink transmissions using allocated resources, for example time/frequency resources. Specific resource partitions may be assigned for transmissions to UEs 120, 140. A portion of the time/frequency resources may be reserved for the downlink transmission of low latency data, and this portion may be referred to as the low latency resources. Some other portion of the time/frequency resources may be reserved for the downlink transmission of latency tolerant data, and this portion may be referred to as the latency tolerant resources. The portion of resources reserved as low latency resources may change dynamically or semi-statically over time, e.g. based on factors such as traffic load, bandwidth requirements, and latency.

Low latency data may be bursty or sporadic in nature, and may be transmitted in short packets. It may be inefficient to dedicate resources for low latency data. Therefore, a coexistence region may be defined in which a resource assignment for latency tolerant traffic overlaps with resource assignment for low latency traffic in the time and frequency domains. Latency tolerant UEs may monitor low latency traffic presence during their transmission if they are scheduled in the coexistence region. In another example, no specific coexistence region may be reserved. Coexistence may happen dynamically within shared time-frequency resources within a carrier bandwidth (BW). Furthermore, it is also possible that coexistence resources may span multiple carrier BWs. Alternatively, an ongoing or scheduled (latency tolerant) transmission may be "punctured" or "pre-empted" by allocating or otherwise using a portion of the resources scheduled for another (low latency) transmission.

In some embodiments, a base station may schedule a first transmission of first data (e.g. latency tolerant data) to a first UE on first resources, and transmit second data (e.g. low latency data) to a second UE on a portion of the first resources. The base station may signal a first indicator or indication to the first UE, for example a configuration indicator or a monitoring indicator (used interchangeably throughout this disclosure) to indicate that the first UE is to monitor for a second indicator that indicates the presence of the second data on the first resources. The first indicator may be signaled via Radio Resource Control (RRC) signaling. The second indicator indicates the presence of the second data on the first resources. Once a first indicator indicating that the first UE is to monitor for a second indicator, the base station may then signal a second indicator to the first UE indicating the presence of the second data on the first resources. The portion of the first resources may be punctured or pre-empted by transmission of the second data.

In some embodiments, a first UE may receive scheduling information from a base station for a first transmission of first data (e.g. latency tolerant data) on first resources. The first UE may receive a first indicator or indication (e.g. a configuration or monitoring indicator), from the base station indicating that the first UE is to monitor for a second indicator that indicates the presence of second data (e.g. low latency data) on the first resources transmitted to a second UE on at least a portion of the first resources. The first indicator may be signaled via Radio Resource Control (RRC) signaling. In some implementations, the first transmission is scheduled in a coexistence region available for transmission of first and second data. After a first indicator indicating that the first UE is to monitor for a second indicator, the first UE may receive a second indicator that indicates the presence of second data on the first resources and decode the first transmission based on the scheduling information and the second indicator. The portion of the first resources may be punctured or pre-empted by transmission of the second data.

Depending on the implementation, the first UE may monitor for a second indicator, for example, when it receives a first indicator indicating that it is to monitor for a second indictor. Alternatively or additionally, the first UE may also receive a first indicator from the base station when no second data is to be transmitted on the first resources. In that case, the first indicator indicates that it is not to monitor for a second indicator. The second indicator may be referred to as a low latency data or traffic indicator, a pre-emption indicator or a puncturing indicator. In the present disclosure, these terms are used interchangeably. The second indicator may be transmitted to the first UE in a unicast transmission or a group-based transmission such as a broadcast transmission or a multicast transmission. In an embodiment, the second indicator may be transmitted using a downlink control channel. The second indicator may indicate the portion of the first resources used to transmit the second data or a portion of the first transmission where the second data is present. The portion of the first transmission indicated may comprise one or more of a code block (CB), a transport block (TB), a group of CBs, or a group of TBs. Alternatively, the portion of the first transmission indicated may comprise one or more of a time resource, a transmission time unit (TTU), a transmission time interval (TTI), a frame, a subframe, a slot, a mini-slot, a symbol, a frequency resource, a resource block (RB) or a resource block group (RBG) of the first resources. The first indicator may comprise a single bit or a plurality of bits. For example, each of the plurality of bits may indicate the presence or absence of the second data on a specific resource of the first resources or on a specific portion of the first transmission. The plurality of bits may correspond to a plurality of time resources or a plurality of frequency resources of the portion of the first resources or a plurality of time-frequency resources of the portion of the first resources. Alternatively or additionally, the plurality of bits may correspond to a plurality of CBs or a plurality of TBs of the first transmission. The first indicator may comprise a pilot signal, e.g., selected based on the presence of the second data on the first resources.

Existing technologies may utilize indication-based downlink (DL) multiplexing. Possible signaling solutions for implicit and explicit indication of low latency traffic arrival during ongoing transmission of latency tolerant traffic may be beneficial. Proposed solutions may use interleaving the code blocks of latency tolerant traffic, and latency tolerant-TB mapping may also be updated for better coexistence experience.

The low latency resources may be partitioned into TTUs. A TTU of the low latency resources may be referred to as a "low latency TTU". A TTU may be a unit of time that can be allocated for a particular type of transmission, for example a low latency data transmission. The transmission can be scheduled or unscheduled. In some embodiments, a TTU is the smallest unit of time that can be allocated for a transmission of a particular type. Also, a TTU is sometimes referred to as a TTI. A low latency TTU, or the duration of a mini-slot, can include any number of symbols that is fewer than the number of symbols in a slot of a latency tolerant TB. Here in this example, it is assumed that the latency tolerant TB spans one slot only. However, in general, a latency tolerant TB may span a duration more or less than one slot and generally, pre-emption or puncturing may be more beneficial when a TB (or other data units) intended for a low latency UE has a duration that is less than the duration of a TB (or other data unit) of a latency tolerant UE. More generally, if a low latency TTU includes N symbols or slots, it may be more beneficial that a latency-tolerant TTU spans M symbols or slots where M>N.

The latency tolerant resources may be partitioned into scheduling intervals, and a scheduling interval of the latency tolerant resources may be referred to as a "latency tolerant UE scheduling interval". A latency tolerant UE scheduling interval is the smallest interval of time that may be scheduled for a data transmission to a latency tolerant UE. A latency tolerant scheduling interval may also be referred to as a latency tolerant TTU. A latency tolerant TTU may span one or multiple slots of a numerology. For example, a latency tolerant TTU can be 1 ms consisting of 14 symbols based on 15 kHz subcarrier spacing. If a slot is defined as 7 symbols, then in this example, a latency tolerant TTU or scheduling interval spans two slots. A low latency TTU may have a duration that is shorter than a latency tolerant UE scheduling interval. By transmitting TBs of a shorter duration in the low latency resources, the latency of the data transmissions to the low latency UEs may be reduced.

It is assumed that at least one TB is transmitted in a latency tolerant TTU or latency tolerant TTI or scheduling interval.

In some embodiments, the low latency resources have a numerology that is different from the numerology of the latency tolerant resources, e.g. the subcarrier spacing of the low latency resources is different from the subcarrier spacing of the latency tolerant resources. The low latency resources may have a subcarrier spacing that is larger than the subcarrier spacing of the latency tolerant resources. For example, the subcarrier spacing of the low latency resources may be 60 kHz, and the subcarrier spacing of the latency tolerant resources may be 15 kHz. By using larger subcarrier spacing, the duration of each OFDM symbol in the low latency resources may be shorter than the duration of each OFDM symbol in the latency tolerant resources. Latency tolerant TTUs and low latency TTUs may include the same number of symbols, or different numbers of symbols. The symbols in latency tolerant TTUs and low latency TTUs may have the same numerology, or different numerologies. If a TTU is defined as having a fixed number of OFDM symbols regardless of numerology, then more than one low latency TTU can be transmitted during a latency tolerant UE scheduling interval. For example, the latency tolerant UE scheduling interval may be an integer multiple of the low latency TTU. The length of symbols in a latency tolerant TTUs and/or low latency TTU may be varied by changing the length of a cyclic prefix in the latency tolerant TTUs and/or low latency TTU. In other embodiments, the low latency resources and the latency tolerant resources have the same numerology. A low latency TTU may then be defined to have fewer OFDM symbols compared to the number of OFDM symbols in a latency tolerant UE scheduling interval, such that there will still be more than one low latency TTU within a latency tolerant UE scheduling interval. For example, the duration of a low latency TTU may be as short as a single OFDM symbol. It is also contemplated that the low latency transmission and the latency tolerant transmission may not have the same number of symbols per TTU, whether or not they have the same numerology. If different numerology is used, the symbols of a low latency TTU may align at the boundary of the one or multiple symbols of the latency tolerant TTU with same or different CP overheads.

A TTU may be divided into a number of slots, for example 20 slots. A low latency slot duration may be equal to or shorter than a latency tolerant slot or a long-term evolution (LTE) slot. A mini-slot may contain any number of symbols that is fewer than the number of symbols in a slot, e.g., 1, 3, 6 symbols if a slot is 7 symbols.

Figure 2:
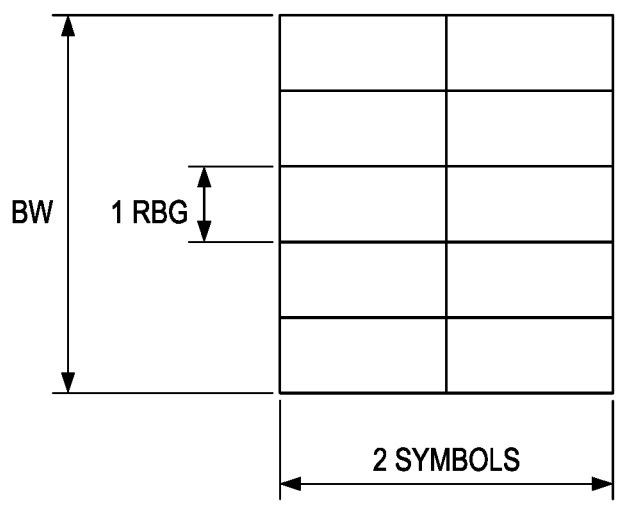
FIG. 2 illustrates an embodiment of mini-slot architecture.

FIG. 2 illustrates an embodiment mini-slot architecture or low latency TTU architecture. Low latency data transmission or a low latency TB is mapped to a low latency TTU, as mentioned above. In this example, a mini-slot spans two symbols. A low latency TB may include physical control format indicator channel (PCFICH) or physical hybrid automatic repeat request (HARQ) indicator channel (PHICH). Duration of a TB and low latency TTU are used interchangeably and it should be appreciated that in the above example, it is assumed that a low latency TTU may include a PHICH or PCFICH channel. Alternatively, PCFICH and/or PHICH indicators may be excluded from a low latency TB. In other words, these channels may be excluded from a low latency TTU. Control information of a low latency TB may be limited to the first symbol or located in the first symbol. Resource elements (REs) containing control information for low latency traffic may or may not be contiguous. The same demodulation reference signal (DMRS) may be used for low latency control information and data. In other words, the same DMRS or aspects thereof can be used for decoding either control information, data information or both. The REs containing the DMRS can be located either in the control channel, the data channel or both. In that example, the same DMRS configuration e.g., port information, QCL, can be used for decoding both control and data of a low latency TTU. Sharing DMRS as described above for control and data decoding may enhance decoding reliability. As time-domain granularity is short, multiple resource blocks can be grouped for minimum resource granularity when a mini-slot is scheduled. In other words, the frequency domain granularity of mini-slot or low latency data transmission can be a resource block group (RBG). The number of symbols in the RBGs assigned for a low latency traffic is given by the duration of the mini-slot or low latency TTU. RBG based resource allocation granularity may be based on compact downlink control information (DCI) or one RBG with minimum granularity.

DMRS may be front-loaded or distributed over the mini-slot duration. A higher aggregation level of control channel element (CCE) in a physical downlink control channel (PDCCH) may be supported, and fewer UEs may be scheduled per mini-slot for more reliability.

In the present disclosure, mini-slot and low latency TTU are used interchangeably.

Figure 3:
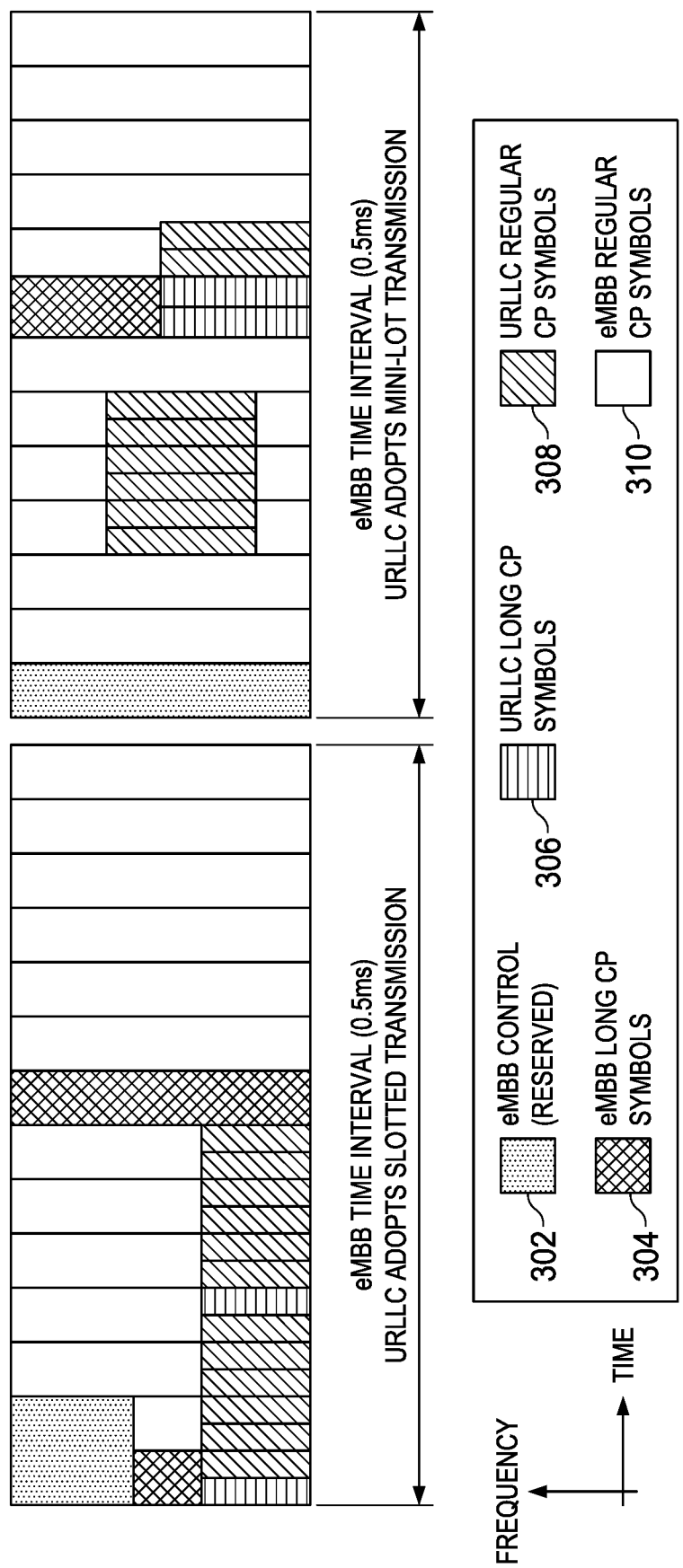
FIG. 3 illustrates an embodiment structure of mini-slots.

FIG. 3 illustrates an embodiment structure of mini-slots. The low latency mini-slot may have a numerology that is different from the numerology of the latency tolerant resources. The transmission of low latency data may be slot-based or mini-slot based. For example, the latency tolerant transmission may have a time duration long enough to contain more than one low latency transmission. Examples of low latency TTU durations and an example of a latency tolerant UE scheduling interval are shown. The eMBB control information 302 may be reserved at the beginning of a single slot or a set of consecutive slots. A long cyclic prefix (CP) eMBB symbol 304 may be slightly longer than a regular-CP eMBB symbol 310; a long-CP URLLC symbol 306 may be slightly longer than a regular-CP URLLC symbol 308. As shown in FIG. 3, a low latency symbol or URLLC symbol may not span the whole bandwidth of a latency tolerant symbol or eMBB symbol. In the example time/frequency resources shown in FIG. 3, specific resource partitions are scheduled for transmissions to latency tolerant UEs and low latency UEs. However, the illustrated resource partitions are only an example. Also, in addition to time/frequency resources, other resources may be allocated for transmission to the latency tolerant UEs and low latency UEs, such as code, power, and/or spatial resources.

Figure 4:
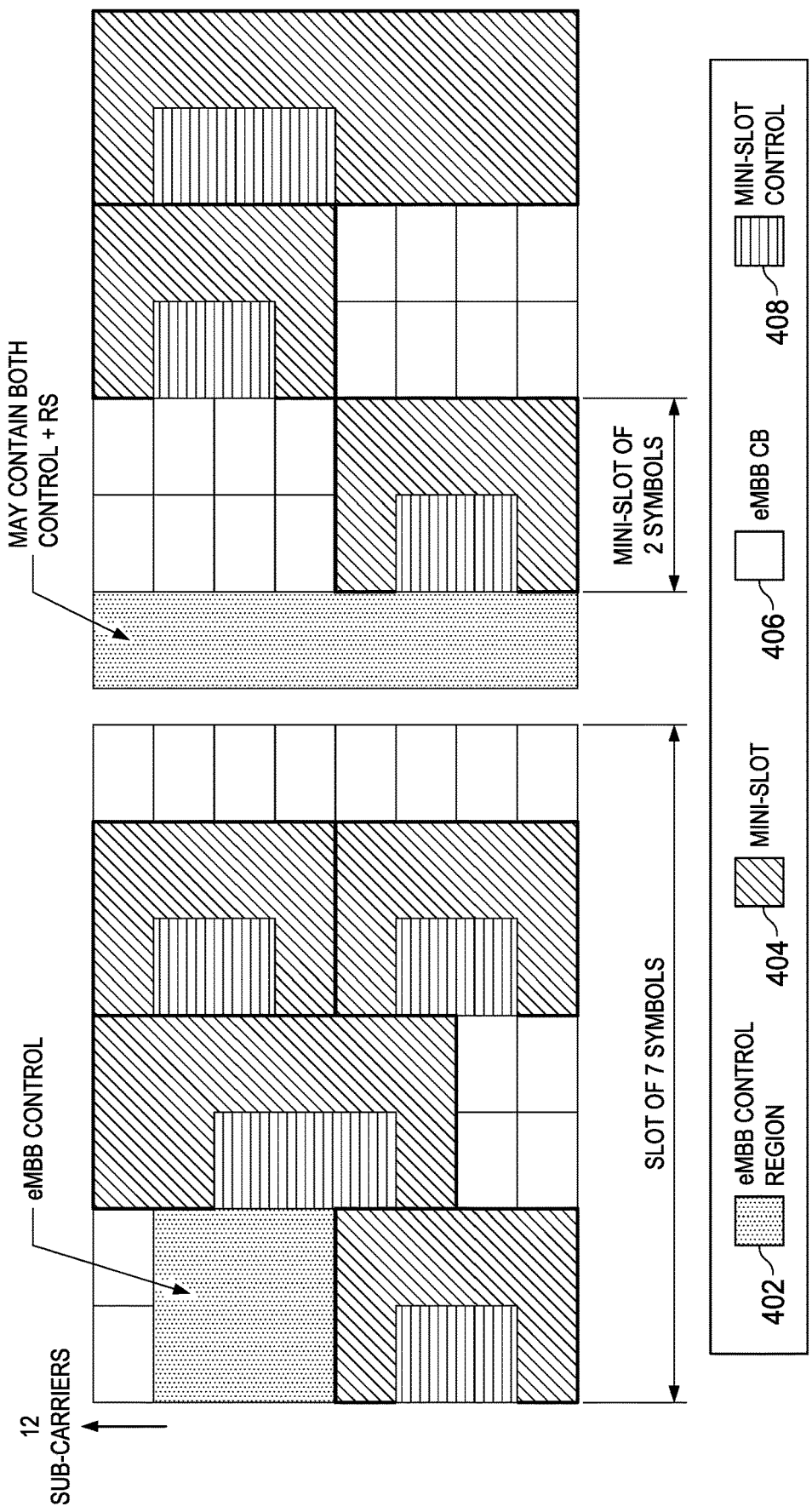
FIG. 4 illustrates two embodiment starting positions of mini-slots.

FIG. 4 illustrates two embodiment starting positions of mini-slots. The starting position of the mini-slot in time and/or frequency domain depends on the frame structure of the slot/TTU used for latency tolerant transmission. The frame structure consists of the control channel field, data channel field, and/or pilot field of a slot. Here, a field can also be referred to as a time-frequency region such as a control channel region or a data channel region. The starting position of the mini-slot shall be orthogonal to the control channel field and/or pilot field of a slot to avoid performance degradation of the slotted transmission of latency tolerant traffic. Depending on whether latency tolerant control information 402 spans one or two symbols, latency tolerant control information 402 may not fully occupy the first symbol of a latency tolerant slot. The mini-slot 404 may start at the first symbol of a latency tolerant slot, or the latency tolerant control 402 and reference signal may fully occupy the first symbol, and the mini-slot 404 may start at the second symbol. Other examples are also possible. For example, a mini-slot may overlap a boundary between two slots such that it overlaps the last one or more symbols of the preceding slot and the first one or more symbols of the subsequent slot. In another embodiment, an ongoing latency tolerant transmission may be "punctured" by replacing a portion of the latency tolerant transmission with a low latency transmission (not shown in FIG. 4). Alternatively, instead of puncturing, the latency tolerant transmission and the low latency transmission may be superimposed on the same time-frequency resources, thus coexist, optionally with a power offset or other appropriate method for each intended receiver to identify and decode its corresponding transmission. The signaling methods described herein for punctured latency tolerant TBs may also be used to indicate superimposed low latency and latency tolerant transmissions.

Even though the description below may assume mini-slot based transmission for low latency traffic, it is contemplated that the methods of indication-based multiplexing described in this invention can be applicable to other forms of transmission of low latency traffic, for example, low latency traffic can be transmitted using a mini-slot, a slot, or aggregation of mini-slots or slots of a numerology.

Indication of low latency traffic arrival/presence may be signaled via the resources normally reserved for control signaling in either transmission type, or by transmitting additional control signaling within the resources that would otherwise be allocated for data within the latency tolerant TB. When a low latency traffic indicator is signaled via the resources reserved for control signaling, it is assumed that the indicator signaled is provided within a control channel region or a control resource set configured in some symbol(s) of a slot which is not used for data transmission. When a low latency traffic indicator is signaled via the resources which can be allocated for data, it is assumed that the indicator is transmitted in a control channel or control resource set configured in some symbol(s) of a slot which can be used for data transmissions as well. For example, different control messages may be used to indicate low latency and latency tolerant traffic when low latency traffic (e.g., URLLC traffic) arrives. Alternatively, a single control message may be used to indicate low latency and latency tolerant traffic at the end of a latency tolerant UE scheduling interval. Signaling of the low latency traffic may be explicit or implicit. For explicit indication, some REs (e.g., contained within one symbol or spanning multiple contiguous or non-contiguous symbols) may be used for signaling. In an embodiment, one or more REs of the latency tolerant traffic or eMBB symbols in which URLLC transmission occurs may be used for signaling. URLLC mini-slots may avoid using those REs for scheduling, e.g., URLLC traffic may be rate-matched for remaining REs. In another embodiment, REs that contain signaling do not overlap with the URLLC mini-slot resources. For example, the REs containing signaling may correspond to different time-frequency resources than the symbols containing the mini-slot. Here, it implies that the time-frequency resources where the low latency traffic indicator signaling is provided may be outside the time-frequency resources where low latency transmission is made. The signaling indicating the presence of low latency traffic and eMBB pilot signals may be scheduled over different resources. Alternatively, signaling indicating the presence of low latency traffic may be scheduled in one or more symbols containing eMBB pilot signals, but not in REs containing eMBB pilot signals, e.g., same symbol(s) that contain eMBB pilot signals may also contain the indication signaling but mapping of indication signaling and eMBB pilot signals to REs would be orthogonal. As yet another alternative, mini-slot signaling may be scheduled in REs containing eMBB pilot signals. When the mini-slot signaling is sent over the same time-frequency resources as eMBB pilot signals, the mini-slot signaling and the eMBB pilot signals may be orthogonal in the code domain (e.g., using orthogonal cover codes) or through spatial multiplexing so that each receiver can identify and decode the transmission intended for it. Here, by mini-slot signaling, it is implied that indication signaling of the presence of mini-slot/low latency data can be transmitted in an overlapping manner with the eMBB pilot signals.

Alternatively, one or more REs of eMBB symbols at the end of an eMBB interval/TTU may be used to collect information of URLLC arrival during the whole interval. REs used for collective indication such as a collective indicator 712 shown in FIG. 7D may puncture regular eMBB data, which together with other punctured data may be transmitted later.

For implicit indication, existing eMBB control, URLLC control, DMRS, and/or other signaling may be used for indication of the presence of URLLC traffic. Either mini-slot resource or eMBB slot resource (e.g., eMBB pilot signals) may be utilized. For example, (part of) mini-slot control and/or DMRS may be blindly detected by an eMBB UE for possible indication. If eMBB traffic is scheduled in multiple aggregated slots, then in each slot DMRS may signal whether or not that slot contains a low latency transmission. Different DMRS sequences or DMRS patterns may be used to indicate the presence of low latency traffic. For example in each TTU/slot of latency tolerant transmission, a DMRS sequence is chosen by the base station based on whether low latency traffic is present or not. The latency tolerant receiver blindly detects which sequence is sent. In another example, a different pattern of DMRS can be sent if low latency traffic arrives.

Figure 5A:
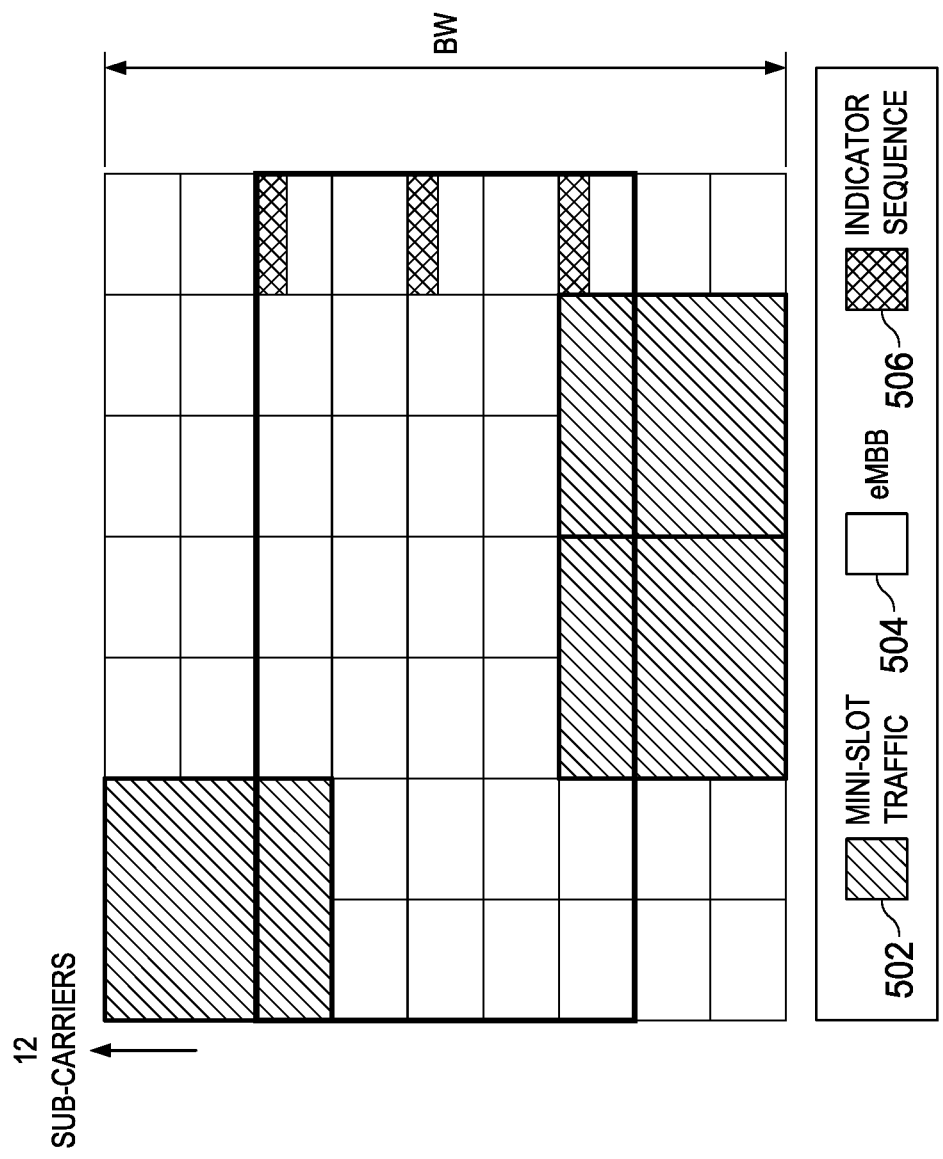
FIG. 5A illustrates an embodiment explicit post indication of mini-slot traffic.

FIG. 5A illustrates an embodiment for explicit post indication of mini-slot traffic, i.e., low latency traffic As discussed below, the indication can be UE specific or group-common (i.e., broadcast/multicast). In this example, a mini-slot 502 duration is pre-configured and/or static; a starting location of the mini-slot is also pre-configured. Here it implies that a low latency traffic may arrive at some pre-configured locations within a slot. An indicator sequence 506 may identify time and frequency resources reserved for mini-slot signaling. Here it implies that indication signaling may provide information about which of the configured time-frequency resources are actually used for low latency data transmission. Even though indication sequence is mentioned in the example, it is an example of the second indicator which indicates the presence of low latency data. As noted above, the second indicator can also be referred to as a low latency traffic or pre-emption indicator. Returning to the example, if a latency tolerant transport block spans x number of mini-slot granularities in frequency and y number of mini-slot granularities in time, then the post-indication may contain xy number of bits to identify which time-frequency areas are pre-empted. If overhead is a concern, only time and/or frequency domain pre-emption information can be conveyed. According to the above example, post-indication may contain x bits (y bits) only if time (frequency) domain pre-emption information is provided. In another example, several time-frequency resources can be grouped and group-based pre-emption indication can be provided, which may require less number of bits compared to the case when information of all time-frequency resource granularities within a latency tolerant transport block is conveyed. As mentioned above, mini-slot granularity in time can be symbol(s) whereas in frequency it can be RBG. It should be appreciated that mini-slot is used as an example, more generally multiple low latency TTUs may exist within the duration of a latency tolerant TTU and time-domain granularity of indication can be based on one or a group of low latency TTUs. Note that at the end of an interval is used as an example for location, it should be appreciated that the content of indication signaling, i.e., xy bits corresponding to an area where pre-emption can occur is general and the indication signaling can be located in any symbol after at least one pre-emption event has occurred. For example, an indication signaling provided after the impacted latency tolerant interval may contain xy bits that correspond to pre-emption events that occurred during the impacted latency tolerant interval.

Figure 5B:
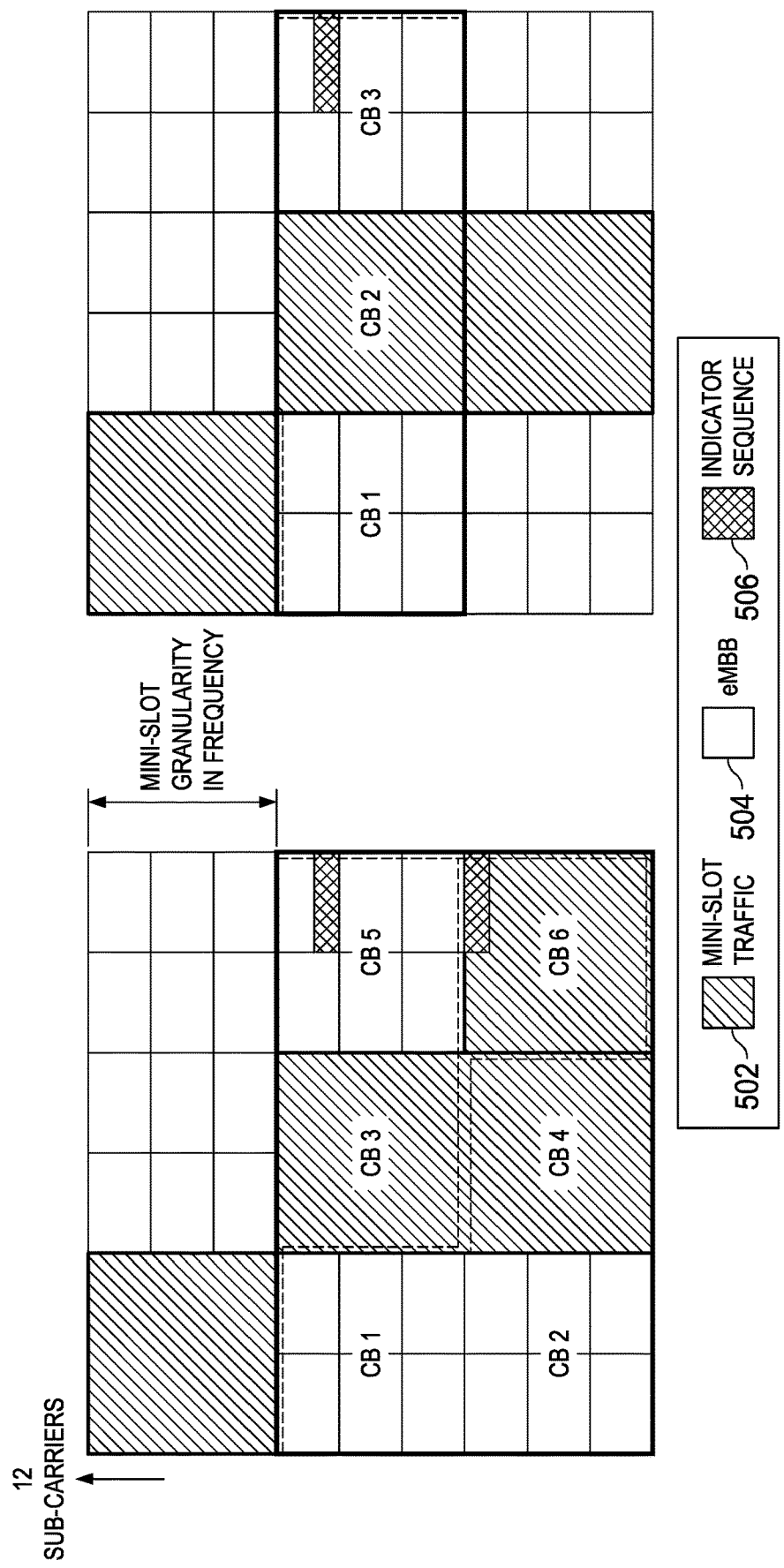
FIG. 5B illustrates an embodiment indication of low latency traffic.
Figure 6:
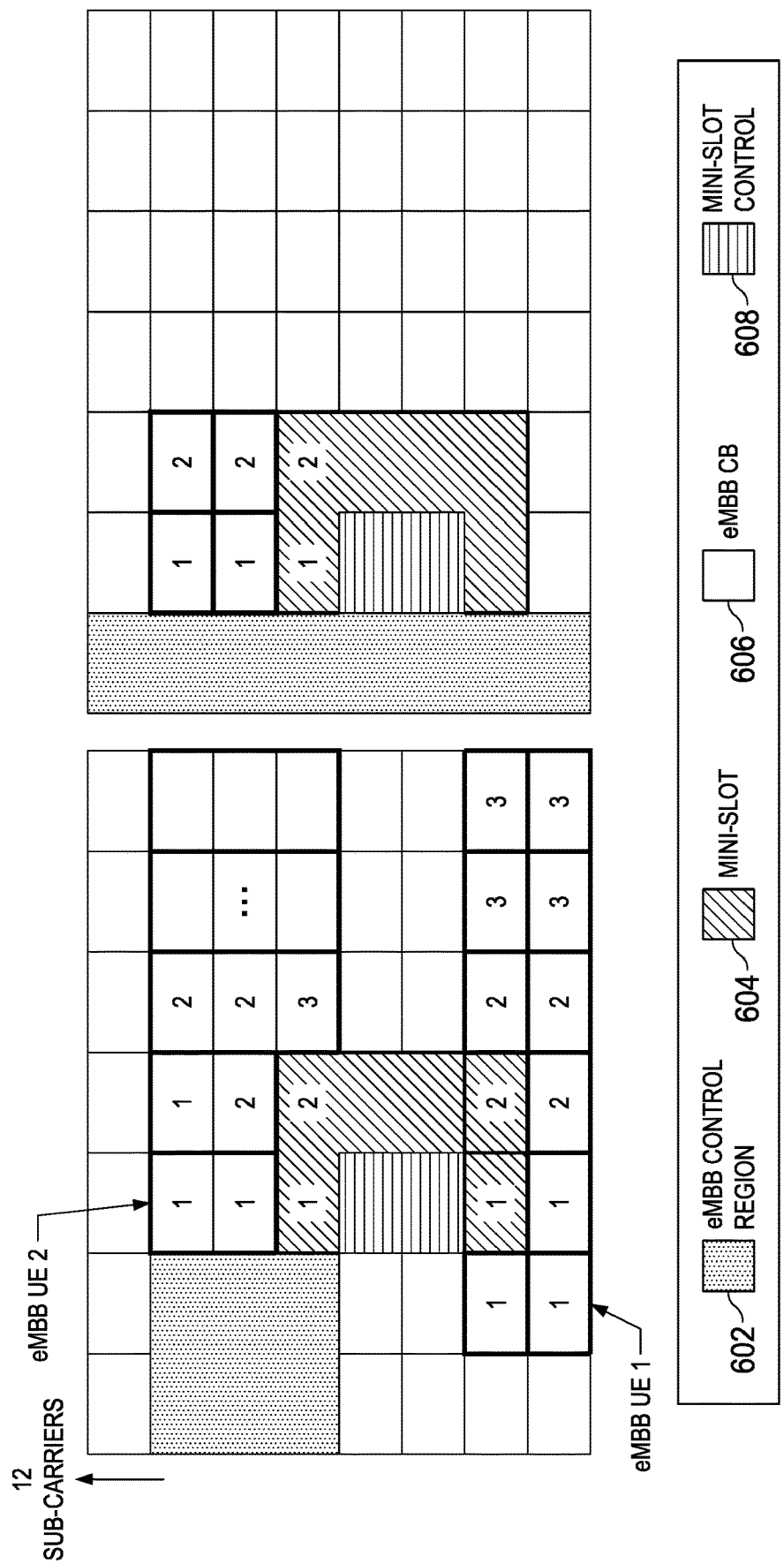
FIG. 6 illustrates an embodiment latency tolerant CB mapping.

FIG. 5B illustrates an embodiment of latency tolerant code block mapping. In this example, the minimum frequency-domain granularity available for scheduling low latency and latency tolerant traffic is the same. This permits low latency traffic to be scheduled within the boundary of a single latency tolerant TB, which can reduce signaling overhead by ensuring that a low latency transmission only affects a single latency tolerant TB. In contrast, as shown in FIG. 6, a low latency transmission that partially overlaps more than one latency tolerant TB would require signaling in each affected latency tolerant TB.

FIG. 5B illustrates an embodiment indication of low latency traffic. This example is also a post-indication example. One field may be utilized to indicate the number of CBs punctured. In this example, the eMBB CBs are punctured. This may be more suitable for a scheme in which the punctured eMBB CBs are transmitted at a later time. The latency tolerant TTU can be subdivided into an integer number of mini-slots. Further quantization levels may also be possible, e.g., CB 25% punctured, 50% punctured etc. An additional indication field may be used for the level of puncture. A single bit indication may be used to indicate the presence or absence of URLLC, or the presence or absence of a threshold amount of URLLC, either for the entire latency tolerant TB or in an individual portion of the latency tolerant TB. The signaling may be transmitted upon arrival of the low latency traffic for transmission, during the time-frequency resources that are used for transmission of the low latency traffic, at the end of the affected latency tolerant TB, or at any other suitable time.

It is possible that in a carrier BW, some resources may be reserved for latency tolerant traffic, and some resources are in a coexistence region available for use by both latency tolerant and low latency traffic. Latency tolerant traffic may receive one or more indication bits in a downlink control information field, to signal whether the latency tolerant traffic is scheduled in the coexistence region or not. If the indication signals that the latency tolerant traffic is scheduled in the coexistence region, then the UE receiving latency tolerant traffic will monitor for the indication of URLLC presence during its transmission, otherwise it can conserve power and will not monitor for further indication during its transmission.

Figure 7A:
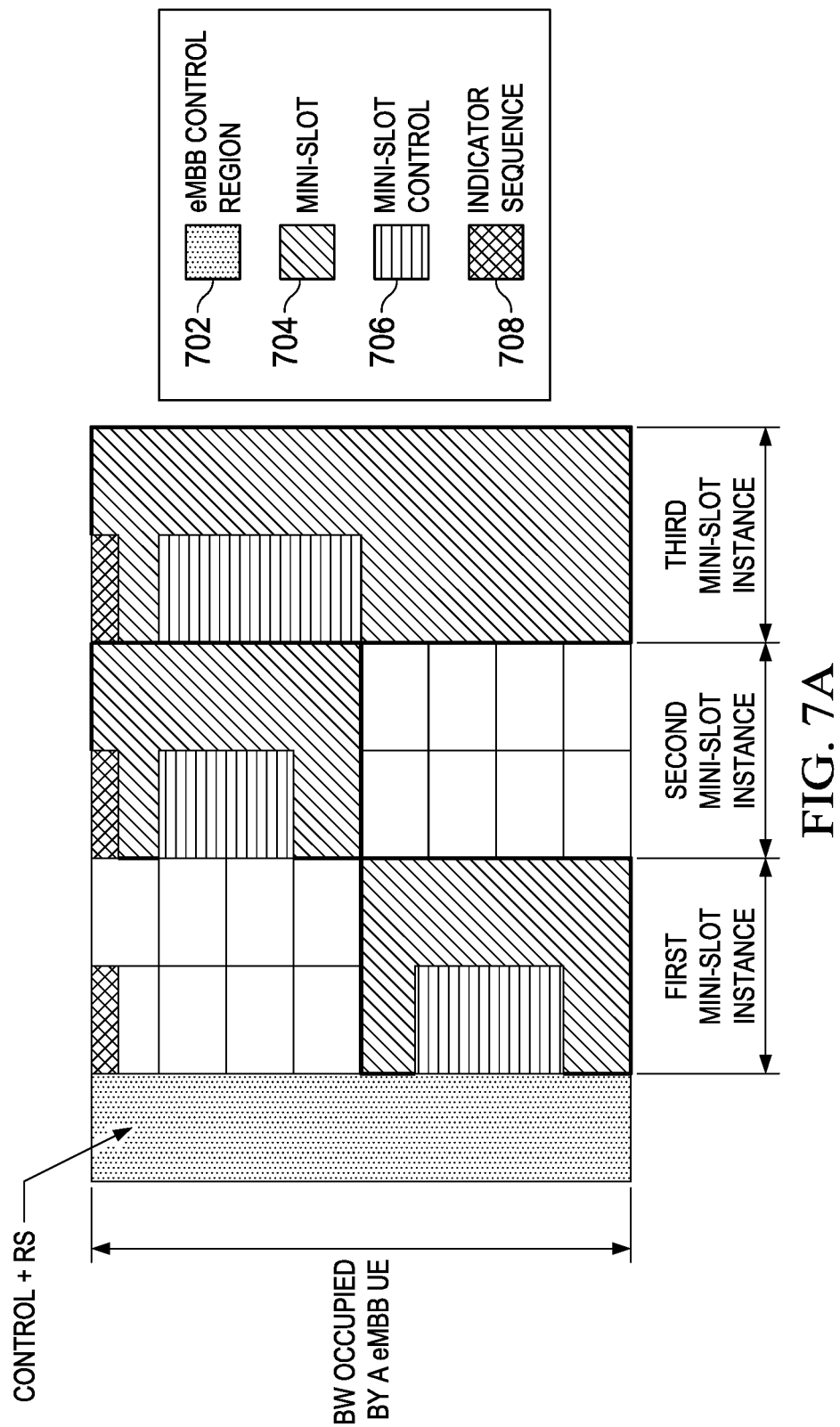
FIGS. 7A-7E illustrate embodiments of mini-slot configurations and signaling.
Figure 7B:
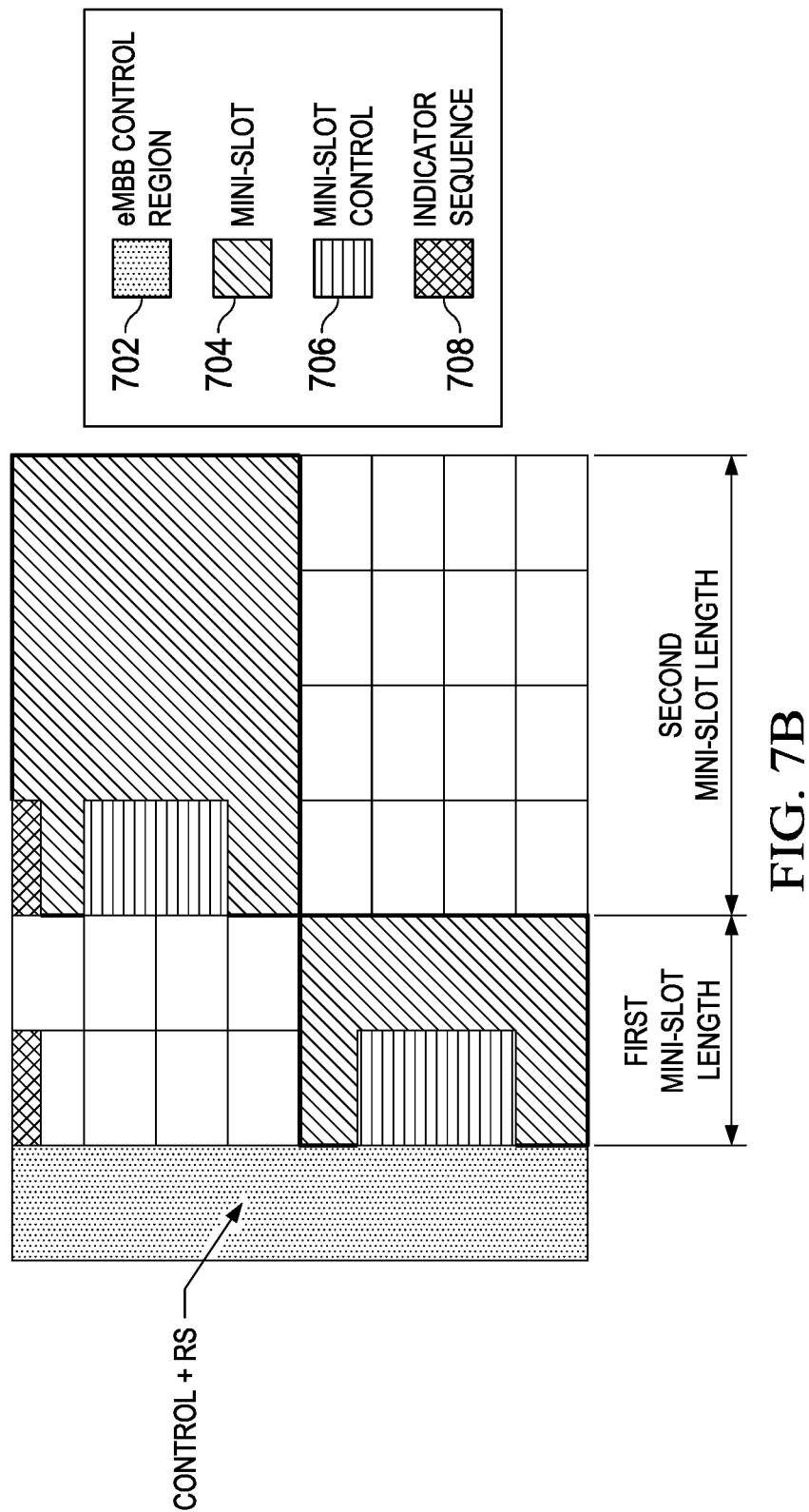
Figure 7C:
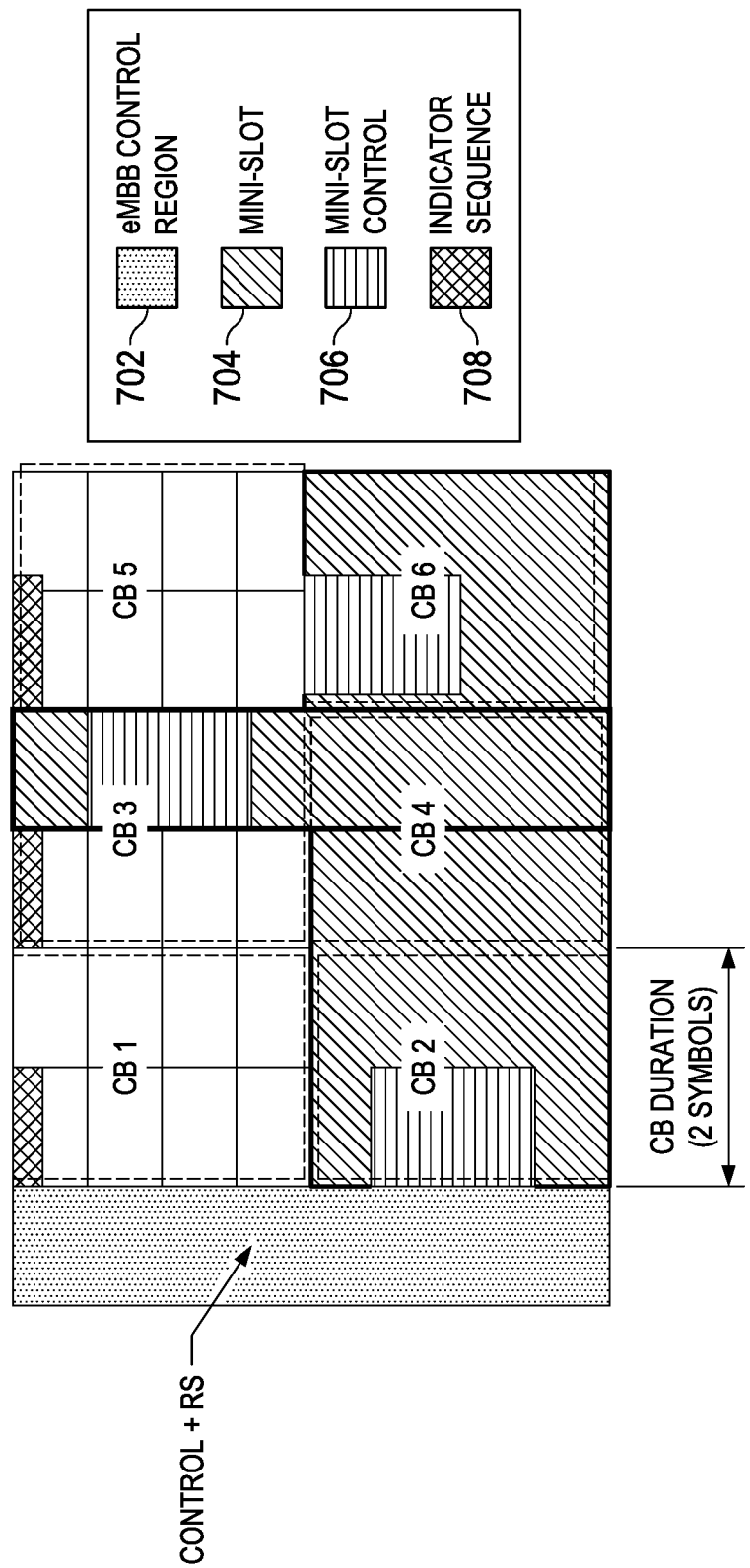
Figure 7D:
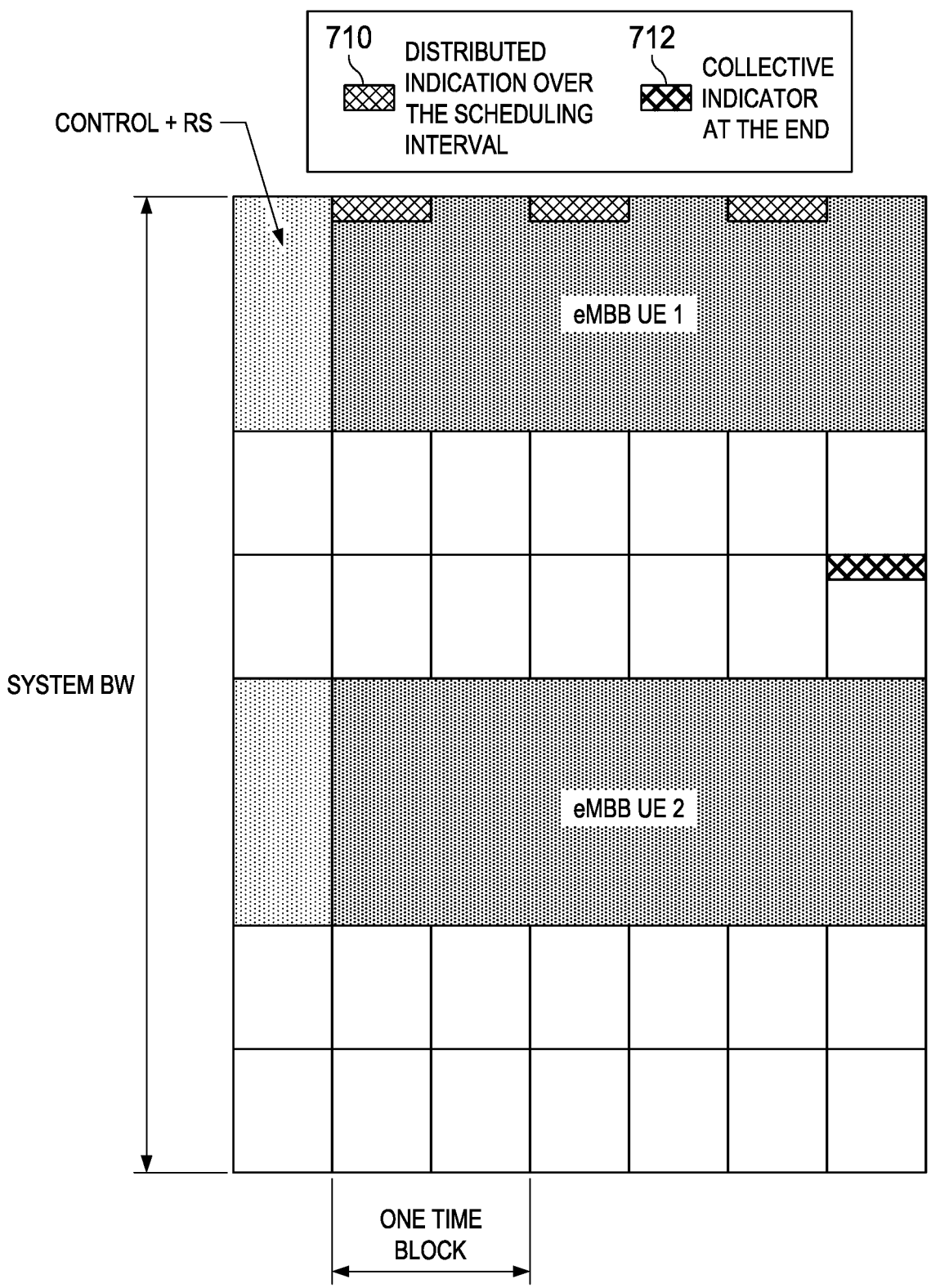
Figure 7E:
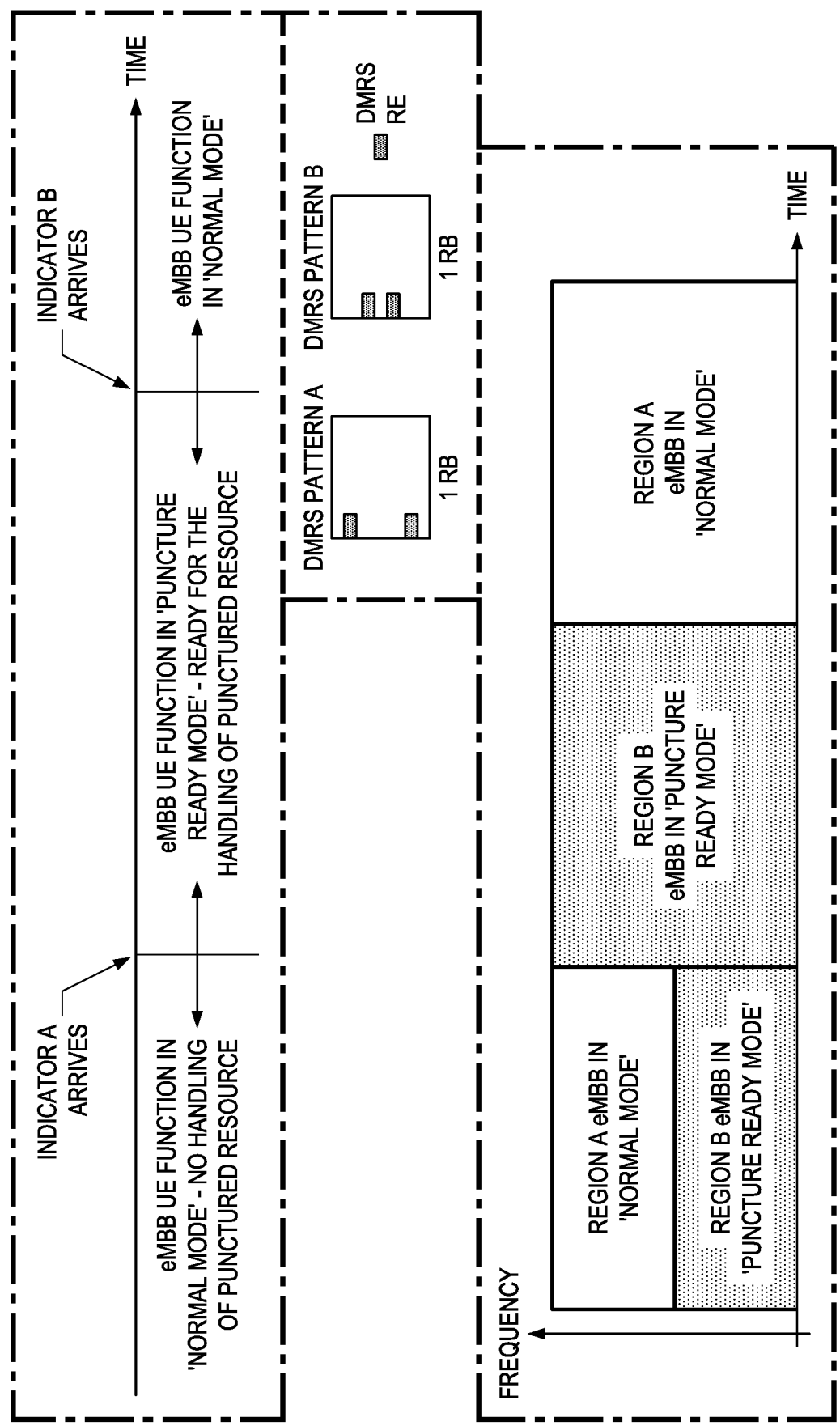

FIG. 7E shows an example of using an indicator to signal to the eMBB UE whether there is URLLC service in a period of time or in a certain frequency band, i.e., whether eMBB UEs need to monitor for low-latency traffic indicators due to the presence of URLLC traffic. If there is no URLLC service in a period of time or in a certain frequency band, then in that time-frequency region, the eMBB UE may not need to monitor for low latency control signaling or account for possible puncturing during its decoding process. If there is URLLC service, the eMBB UE would function in a co-existence (or puncture-ready) mode, which may involve being able to decode a received TB that has been punctured. This indication can be explicit, e.g., using higher layer signaling (Radio Resource Control (RRC)) or dynamic physical layer signaling. It can also be implicit, e.g., using different DMRS patterns. A first DMRS pattern may indicate no URLLC traffic, a second DMRS pattern may indicate the possibility of URLLC traffic, and so handling of punctured eMBB information may be used. It may also be done via sub-band division: one sub-band is eMBB-only; the other sub-band is eMBB+URLLC. The benefit of this indication is to save eMBB UE's processing overhead if there is no URLLC traffic in a period of time or in a certain frequency band.

In one example, a first indicator such as a configuration indicator is signaled to the eMBB UE via RRC signaling to configure the UEs to monitor for low latency traffic indicators. In addition to notifying an eMBB UE that it needs to monitor for low latency traffic indicators, one or more parameters for configuring the eMBB UE for low latency traffic indicator monitoring may be included in the configuration indicator. Examples of parameters include one or more of the following: a) a monitoring interval for monitoring low latency traffic indicators, b) a time granularity (e.g., a number of symbol(s) or slot(s)) and/or frequency granularity (e.g., RBG or part of carrier bandwidth) used for content of the low latency indicator, c) time-frequency resource set(s) or control resource set(s) where the low latency traffic indicators need to be monitored, d) a type of low latency traffic indicator, i.e., a UE specific or a group-common, e) time duration and/or part of carrier bandwidth that the low latency traffic indicator corresponds to, or f) RNTI information of the PDCCH that contains the low latency traffic indicators. In another example, all of these parameters may be grouped together and sent at once to the eMBB UE or they can be notified to the UE at different stages of signaling or in separate signaling messages, e.g., one or more of the parameters can be notified by one or more of: UE specific or cell specific RRC signaling, system information, MAC CE, or downlink physical layer signaling. In yet another example, one or more parameters of configuration for low latency traffic indicator monitoring can be numerology specific. For example, if 60 kHz SCS is used, a time unit for the low latency traffic indicators can be x slot(s), x≥1, whereas if 15 kHz SCS is used, the time unit can be x symbol(s), x≥1. The time unit and/or monitoring interval in terms of symbols/slots may be implicitly derived based on the numerology used for transmissions. In one example, frequency granularity, e.g., RBG size or portion of a bandwidth, and time granularity, e.g., symbols, may be obtained from the configuration of bandwidth part addressed by the indicator and monitoring interval/periodicity of the indicator.

The above embodiments related to fixed mini-slot length and/or fixed start position of a mini-slot within a latency-tolerant TB, i.e., the duration that a latency-tolerant TB spans. In another embodiment, as shown in FIG. 7B, different mini-slot lengths may be used. For example, low latency traffic at a cell edge may be served with a mini-slot that is longer than that used for serving low latency traffic near the cell center. A base station may dynamically schedule mini-slot lengths depending on when low latency traffic arrives and a mini-slot may start at any symbol within the TB boundary, but may or may not cross the TB boundary. Here, by TB boundary, boundary of a latency-tolerant TTI/ interval is implied.

In an embodiment, retransmission of latency tolerant traffic may occur in another sub-band with a different numerology. For example, initial transmission of latency tolerant traffic occurs in the coexistence region in a sub-band with 60 kHz subcarrier spacing, and retransmission occurs in a different sub-band with 15 kHz subcarrier spacing.

On Arrival Explicit Indication

Fixed Mini-Slot Length and Start Position

Referring to FIG. 7A, in one embodiment, one or more REs during each mini-slot 704 duration can be used for explicit signaling of the presence or absence of low latency traffic. As mentioned above, signaling REs may be contained within one symbol of the mini-slot or span multiple symbols of the mini-slot. One option is to signal using the resources where the low latency transmission occurs. However, depending on the occupied BW of the transport block of the latency tolerant traffic and mini-slot granularity in frequency, the signaling search space may be undesirably large for the latency tolerant UE, and the signaling may cause a loss of spectral efficiency. Instead, some REs in a pre-configured location may contain signaling of punctured information for that mini-slot duration. The REs may be reserved for signaling, or the receiver may blindly detect whether those REs contain signaling or data. For example, the indication 708 may be just 1-bit, indicating the presence or absence of low latency traffic in that mini-slot. In another example, the signaling can contain as many bits as the number of mini-slots that fully or partially overlap with the BW occupied by the latency tolerant traffic, and each signaling bit can indicate the presence of low latency data in a corresponding mini-slot. In another example, the signaling can contain one bit for each CB that is punctured. Examples may also include coarse signaling, for example with each bit corresponding to a group of CBs or group of REs which may span a frequency range corresponding to multiple mini-slots. Each mini-slot instance may have a corresponding pre-configured resource for signaling to the latency tolerant UE. For example, if the mini-slot is two symbols in length and can start at the second, fourth, or sixth symbol within a slot of 7 symbols, and latency tolerant traffic is scheduled with 10 RBs, then one or more sub-carriers of one or more RBs may be configured to contain signaling for each potential mini-slot occurrence. In an example, one or more sub-carriers of an RB in each of the second symbol, fourth symbol, and sixth symbol of the latency tolerant slot may contain signaling information for mini-slots respectively occupying the second and third symbols, fourth and fifth symbols, and sixth and seventh symbols.

Flexible Mini-Slot Length and Start Position

If multiple mini-slot lengths coexist, as shown in FIGS. 7B-7C, and/or the start time of a mini-slot is flexible, as shown in FIG. 7C, signaling of the exact time-frequency resources of a mini-slot may require an undesirably large signaling overhead. In FIG. 7B, mini-slots of multiple lengths are shown to coexist, but the start location for the mini-slots is fixed. Here, an indicator may (explicitly or implicitly) contain mini-slot length information. For example, an indicator at the pre-configured location at the 4th symbol notifies an eMBB UE that a mini-slot length of four is used, not two. Referring to FIG. 7C, a latency tolerant traffic receiver may monitor for signaling at a pre-configured location, which might not correspond to the location of the mini-slot to which the signaling refers. For example, depending on how the CBs of latency tolerant traffic are mapped to time-frequency resources, the signaling can be CB based. In FIG. 7A, each CB mapping spans two symbols. The latency tolerant UE may monitor for signaling every two symbols to determine whether any of its CBs are pre-empted, either partially or fully. The mini-slot duration may or may not align with the CB duration. For example, a mini-slot may span three symbols. The signaling of every two symbols may provide different types of punctured information. In one example, the signaling can be a single bit, indicating whether any punctured occurred or not. In another example, signaling can indicate how many CBs are affected by low latency traffic. Additional information can be signaled, at the cost of increased overhead, such as how much of each affected CB is punctured.

In another embodiment as shown in FIG. 7D, broadcast and/or multicast indication (also referred to as group-common indication) may also be sent, which can be implicit or explicit. Broadcast and/or multicast indication location may be outside the time-frequency resources scheduled for one or multiple eMBB UEs. Indication can appear every time block or at the end of a scheduling interval. One time block or transport block may span one or more symbols. An indicator can be contiguous in frequency or distributed. An indicator may span one or more symbols within a time block as well. Here, a time block may or may not represent a mini-slot duration, i.e., mini-slot boundary may or may not align with the time-blocks. Similar to the discussion above and as can be seen from FIG. 7D, the content of a broadcast or multicast indication addresses a time-frequency region and may comprise xy or more generally integer number of bits which provides pre-emption information corresponding to a time-frequency region or a coexistence region, i.e., time duration (e.g., in symbol(s)) and frequency band (e.g., in RBGs or Hz). For the frequency granularity, RBGs can be based on a given numerology in the frequency region addressed by the broadcast/multicast indication. Alternatively, the frequency granularity can be a portion of the frequency band or bandwidth part (in Hz) addressed by the broadcast/multicast indication for a given numerology. The numerology can be eMBB numerology or URLLC numerology or any other numerology, e.g., a reference numerology (e.g., 15 kHz/30 kHz/60 kHz etc.). Similar to FIGS. 7A-7C, broadcast/multicast indication can be conveyed in a pre-configured time-frequency resource that is known to the eMBB UEs monitoring the indication. If there is one group-common indication sent, it may correspond to the coexistence region where both traffic can be scheduled. It should be noted that the content of the broadcast/multicast indication discussed here may also be applicable to the case of a UE specific indication. In one embodiment, FIGS. 7A-7C show examples of UE specific indication.

Figure 8:
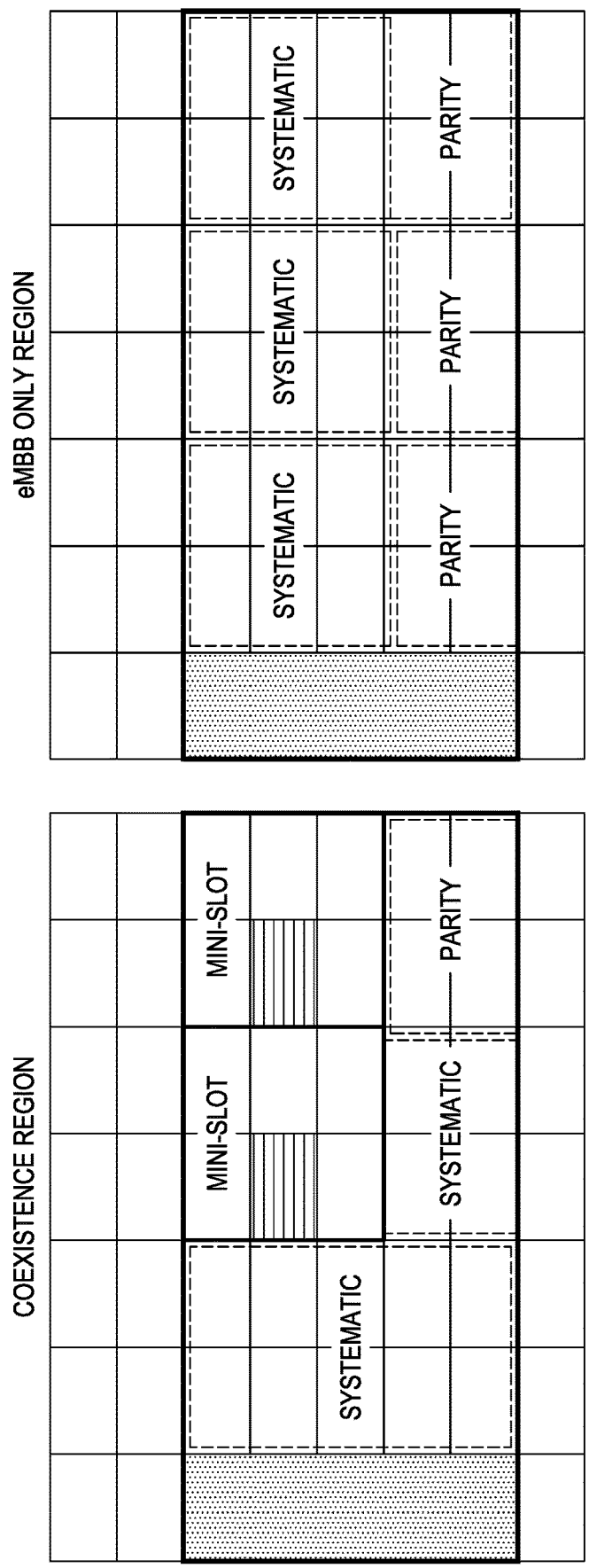
FIG. 8 illustrates an embodiment dynamic allocation of resources for latency tolerant traffic in a transport block (TB).

FIG. 8 illustrates an embodiment dynamic allocation of resources for latency tolerant traffic in a TB. For a single forward error correction (FEC) bit, systematic bit and parity bit mapping of latency tolerant data may be dynamically updated. Systematic bits may be transmitted over resources that are less likely to include low latency traffic than parity bits in coexistence regions. It is more beneficial to puncture parity bits than systematic bits because systematic bits are more useful for decoding a received transmission. An eMBB UE may or may not require explicit signaling for re-ordering bits for decoding. Based on a URLLC indication and the allocated code rate, the eMBB UE may determine the appropriate ordering of the received bits, and decide which bits/resources are punctured. Alternatively, the base station may indicate the order of the bits in the signaling, e.g., at the end of a scheduling interval.

Figure 9A:
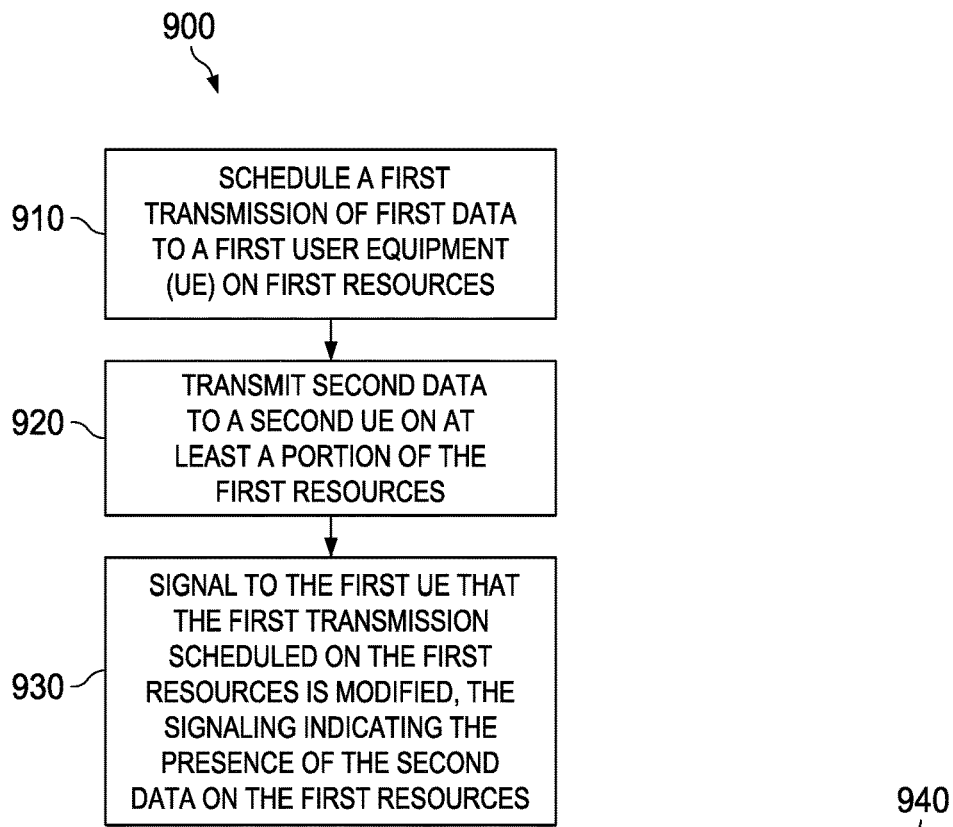
FIGS. 9A-9C illustrate embodiment methods for signaling low latency traffic in a communications system.

FIG. 9A illustrates an embodiment method 900 for signaling low latency traffic, as may be performed by a base station or eNB. As shown, the method 900 begins at step 910, where the base station schedules a first transmission of first data to a first UE on first resources. Thereafter, the method 900 proceeds to step 920, where the base station transmits second data to a second UE on at least a portion of the first resources. Subsequently, the method 900 proceeds to step 930, where the base station signals to the first UE that the first transmission scheduled on the first resources is modified. The signaling may indicate the presence of the second data on the first resources.

Figure 9B:
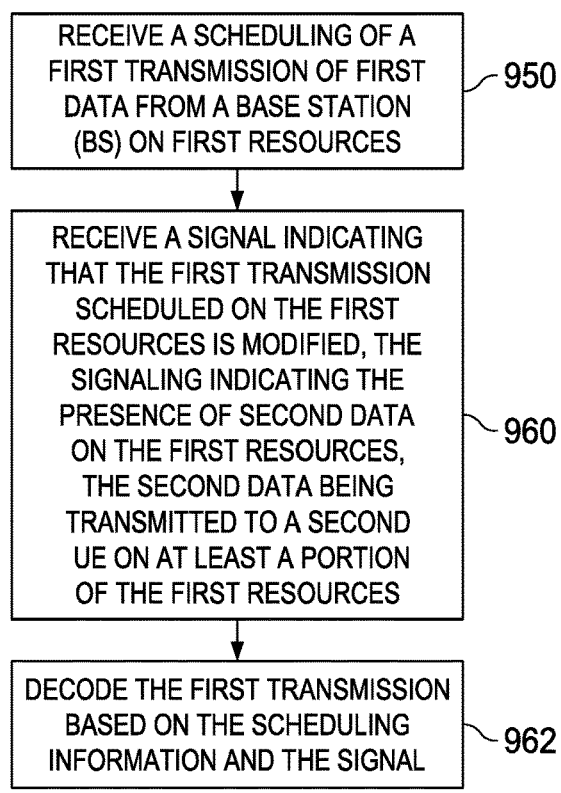

FIG. 9B illustrates another embodiment method 940 for signaling low latency traffic, as may be performed by a first UE. As shown, the method 940 begins at step 950, where the first UE receives a scheduling of a first transmission of first data from a base station (BS) on first resources. Thereafter, the method 940 proceeds to step 960, where the first UE receives a signal indicating that the first transmission scheduled on the first resources is modified. The signaling may indicate the presence on the first resources of second data transmitted to a second UE on at least a portion of the first resources. Subsequently, the method 940 proceeds to step 962, where the first UE decodes the first transmission based on the scheduling information and the signal.

Figure 9C:
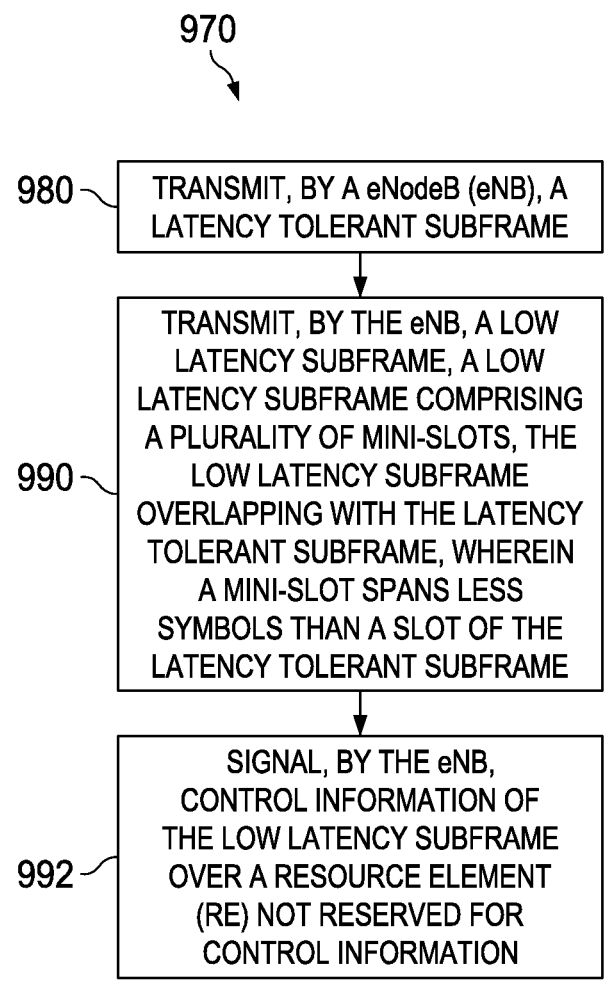

FIG. 9C illustrates an embodiment method 970 for signaling low latency traffic. As shown, the method 970 begins at step 980, where a base station transmits a latency tolerant TB. Thereafter, the method 970 proceeds to step 990, where the base station transmits a low latency TB. The low latency TB may overlap with the latency tolerant TB, e.g., in time and frequency. A low latency TB may comprise a plurality of mini-slots. A mini-slot may span fewer symbols than a slot of the latency tolerant TB. At step 992, where the base station signals control information of the low latency TB over a resource element (RE).

Indication and Reserved Resources/Control Region

In a new radio (NR) frame structure, any symbol in a sub-frame may have a control region or control resource sets where downlink control signaling is sent to one or a group of UEs. Furthermore, for forward compatibility, some symbols or time-frequency resources within a sub-frame may be reserved and not used for control and/or data transmission. Moreover, a time portion of an interval may not be used for transmission, for example, when a UE switches from one RF BW (e.g., where a scheduling grant is provided) to another RF BW (e.g., where resources are assigned for a data transmission). URLLC transmission may occur during the unused time portion of an eMBB transmission, but eMBB UEs may not need to be notified of this as no pre-emption occurs.

When configured, the pre-emption indication (e.g. a low latency traffic indicator, pre-emption indicator or puncturing indicator) signaled provides information about the time and/or frequency resources where pre-emption or puncturing happened where some resources of ongoing eMBB UE(s) traffic are (pre-empted and) used for URLLC transmissions. For example, one indication signal can be sent every x symbol(s) and it corresponds to a time and/or frequency region within the last or next k (e.g., $k \leq x$ symbol(s)) where pre-emption may occur. The duration of k symbols may have some control region or reserved resources configured. Or some locations may be reserved for a reference signal (RS) or some unused time portion. In some embodiments, URLLC transmission may or may not be scheduled overlapping those time-frequency resources.

(Higher layer) configuration signaling or system information may notify the UEs of the location of one or more of: control region, reserved resources, or RS. The time-frequency resources indicated by this signaling (e.g. a configuration indicator) may include or exclude the region which is otherwise not used for transmission. In the embodiments below, reserved resources are used as an example of a region where a URLLC transmission is avoided, however it should be appreciated that it can be extended to consider any region which is otherwise exempted for URLLC transmission, such as some control region and RS.

Figure 10A:
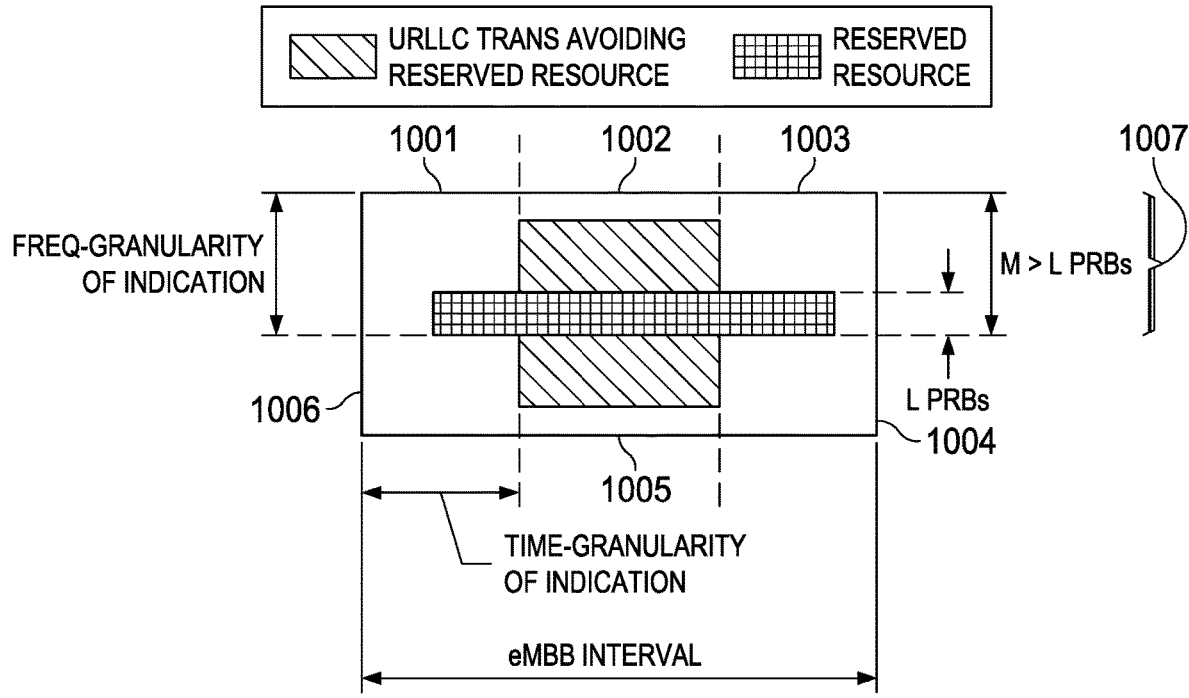
FIGS. 10A-10D illustrate embodiments of reserved resources and indications for low latency traffic.
Figure 10B:
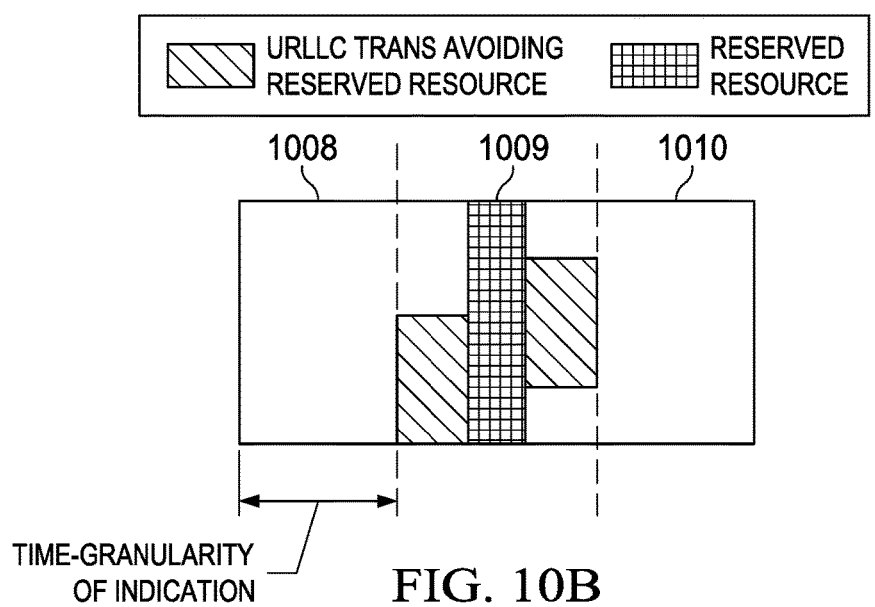

In one example, the bitmap or content of the indication may correspond to a time-frequency region that includes reserved resources. Based on higher layer signaling of reserved resources and information provided by the indication, an eMBB UE identifies which areas are actually impacted or pre-empted by a URLLC transmission. In FIG. 10A, an example of a pre-emption indication is shown corresponding to a time-frequency region that is divided into two frequency partitions and three time partitions 1001-1006. There are six sub-regions and a six bit indication where each bit corresponds to a particular sub-region and indicates the presence or absence of URLLC data or whether the sub-region is pre-empted or not. As can be seen, a first frequency partition 1007 includes a reserved resource 1001-1003. Pre-emption occurred during a second time partition in both frequency partitions. In this example, the pre-emption indication notifies of pre-emption events in those sub-regions. However, as the eMBB UE(s) are aware of the location of reserved resources beforehand (e.g. as signaled via a configuration indicator), the reserved areas are excluded when it takes the pre-emption information into account for decoding eMBB transmission. In one example, the first frequency partition is M>L PRBs whereas reserved resources span L PRBs. In FIG. 10B, a similar example is shown where region is partitioned into three time granularities/partitions 1008-1010. The second partition 1009 has some reserved areas configured in it. When it is indicated that the second partition 1009 is impacted/pre-empted, eMBB UE(s) exclude the configured reserved area and assume rest of the portion of that partition is impacted/preempted.

Figure 10C:
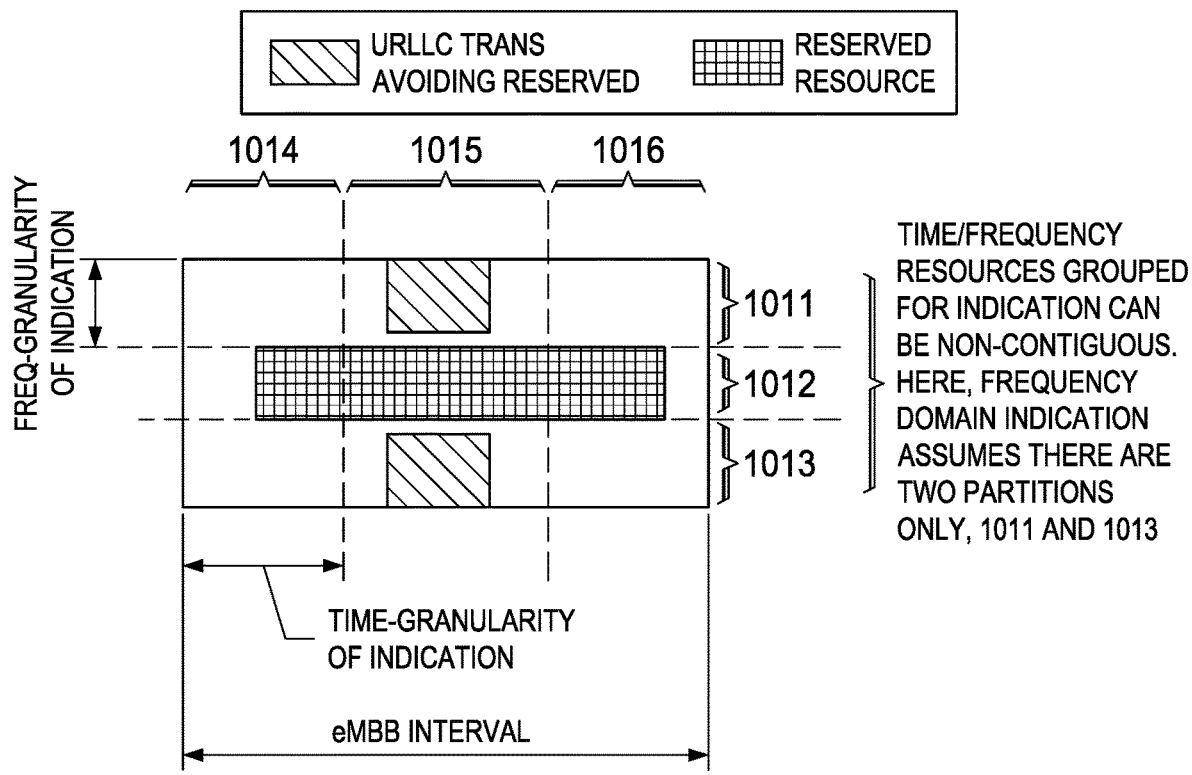

In another example, the bitmap or content of pre-emption indication may correspond to a time-frequency region that excludes reserved resources. In FIG. 10C, an example is shown where frequency resources are partitioned into three regions 1011-1013, where one region contains reserved resources. Here, the indication signaling (e.g. a configuration indicator) provides pre-emption information for other two frequency partitions, which are indexed as 1011 and 1013. Even though there are three partitions 1011-1013, the indication signaling corresponds to two frequency partitions 1011 and 1013 only. In FIG. 10C, two frequency partitions 1011 and 1013 and three time partitions 1014-1016 are considered for indication signaling. In general, time partitions and/or frequency partitions that comprise the content of indication signaling may or may not be contiguous.

Figure 10D:
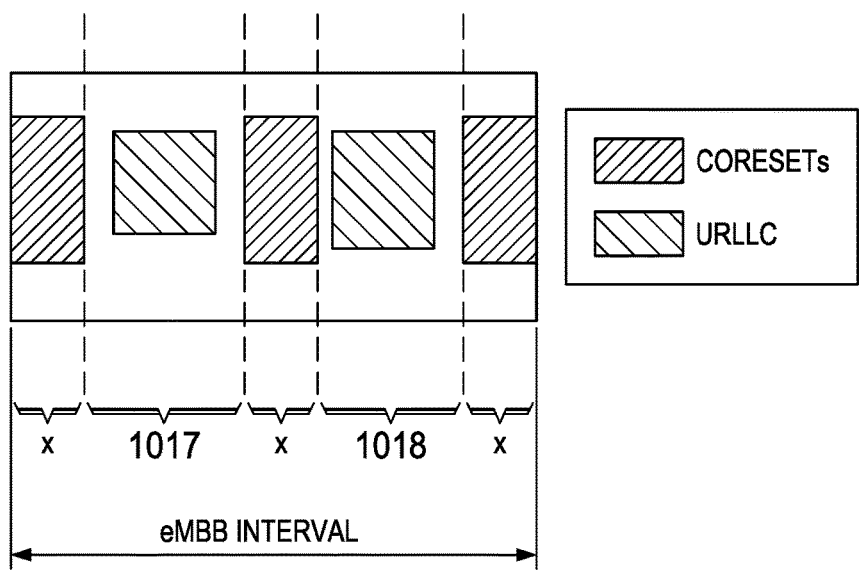

In another example, shown in FIG. 10D, some symbol(s)/region of an eMBB interval or any duration are not used for URLLC transmission. Those symbols may contain reserved resources/control region/RS. For example, CORESETs may not be pre-empted, and a CORESET region may be reserved as well. Time-frequency resources indicated may or may not include regions of CORESETs. Specifically, configuration time and/or frequency granularity or division may exclude a CORESET region. In this case, a number of bits required for indication may be based on resulting time-frequency resources excluding CORESETs. As shown in FIG. 10D, some time partitions are identified as 'x' which are not included in the content of the indication. Two partitions indexed 1017 and 1018 are considered for signaling only. Whether an indication is configured to provide time-frequency pre-emption information that include CORESET or reserved resources may be notified via RRC signaling.

eMBB Bandwidth Parts and Configuration of Indication Signaling

An eMBB UE may be configured with one or multiple bandwidth part candidates. During transmission, one or more of the configured bandwidth parts are activated. Bandwidth part configurations may be provided to the eMBB UEs by higher layer signaling, such as RRC. In one example, whether an eMBB UE requires to monitor pre-emption indication can be based on which bandwidth part(s) are being used for transmission. Configuration of a bandwidth part may include configuration of pre-emption indication. Configuration of pre-emption indication may include one or more of the following; 1) whether a UE needs to monitor indication, 2) what is the monitoring interval and/or time-frequency location(s) of indication, 3) Content of the indication or configuration of time and/or frequency granularities that constitute the bitmap of the content, 4) type of indication, e.g., whether content of indication is UE specific or group-common and/or if it is group common, how the UE finds the relevant pre-emption information inside the common indication.

In one example, an eMBB UE is configured with two bandwidth parts A and B. If bandwidth part configuration A is used, the UE assumes that its transmission can be pre-empted and it needs to monitor indication. If bandwidth part configuration B is used, the UE assumes that its transmission is exempted from pre-emption and it does not need to monitor indication In another example, configuration of a pre-emption indication is separately provided to the UE(s) by higher layer signaling and not included in bandwidth part configuration.

In another example, eMBB UEs are configured with one or multiple bandwidth parts. The active bandwidth part(s) where scheduling information and/or data was transmitted may or may not contain the CORESET(s) of the PDCCH where low latency traffic indicator is sent. Alternatively, CORESET(s) of low latency traffic indicator may be monitored in one or more bandwidth parts separately configured than those used for scheduling grant and/or data transmission. It may be possible that some eMBB UE(s) may have more than one active bandwidth parts in a given time instant, e.g., at least one for data transmission and at least one for monitoring CORESET(s) of low latency indicator. For a group-common low latency traffic indicator, common search space may reside in a resource set that overlaps with at least one bandwidth part of each of a group of eMBB UEs. As discussed above, common search space or pre-configured location where group-common indicator is monitored may be inside or outside the bandwidth parts used for data transmission.

In one example, for the UEs that are configured to monitor low latency traffic indicator, at least one of the bandwidth parts configured for a UE contains CORESETs of group-common indicator. The bandwidth part and/or CORESET that contains group-common indicator may optionally also include UE specific search spaces where PDCCH providing scheduling grant may be received. If a UE monitors more than one type of group common PDCCH, it may be possible that UE monitors them with same or different periodicity in same or different CORESETs or bandwidth parts.

In one example, an UE may need to re-tune to a different RF BW from existing/current RF BW to receive low latency traffic indicator.

In one example, when the UE is configured to monitor indication during an ongoing transmission, following cases are possible: 1) UE supports receiving transmission over only one active bandwidth part at a given time. The CORESET(s) of one or multiple pre-emption indication are inside the active bandwidth part. 2) UE supports receiving transmission over multiple bandwidth part at a given time. The CORESET(s) of one or multiple pre-emption indication can be within the active bandwidth part used for data transmission or in a different bandwidth part.

In one example, when the UE is configured to monitor indication after an ongoing transmission, following cases are possible: 1) The CORESET(s) of one or multiple pre-emption indication are inside the same bandwidth part where impacted transmission occurred. 2) The CORESET(s) of one or multiple pre-emption indication can be in a different bandwidth part than used for previous impacted data transmission. It may be possible that based on the monitoring interval, there is a time pattern notified to the UE by RRC signaling which bandwidth part to use or tune to for receiving the pre-emption indication. For example, at the monitoring occasion, the bandwidth part that contains search space or pre-configured location of the pre-emption indication is also used for transmitting scheduling grant and/or data.

In one example, if group-common indication is configured, the search space or CORESET(s) of the indication is configured in a location that overlaps with at least one bandwidth part of each UE of a group of UEs that are monitoring the indication. In some cases, network may repeat the group-common indication in multiple CORESETs, for example, when it is not feasible to configure bandwidth parts of every UE in the group to include the common search space. Some UEs' bandwidth pails may be limited in size.

Figure 11:
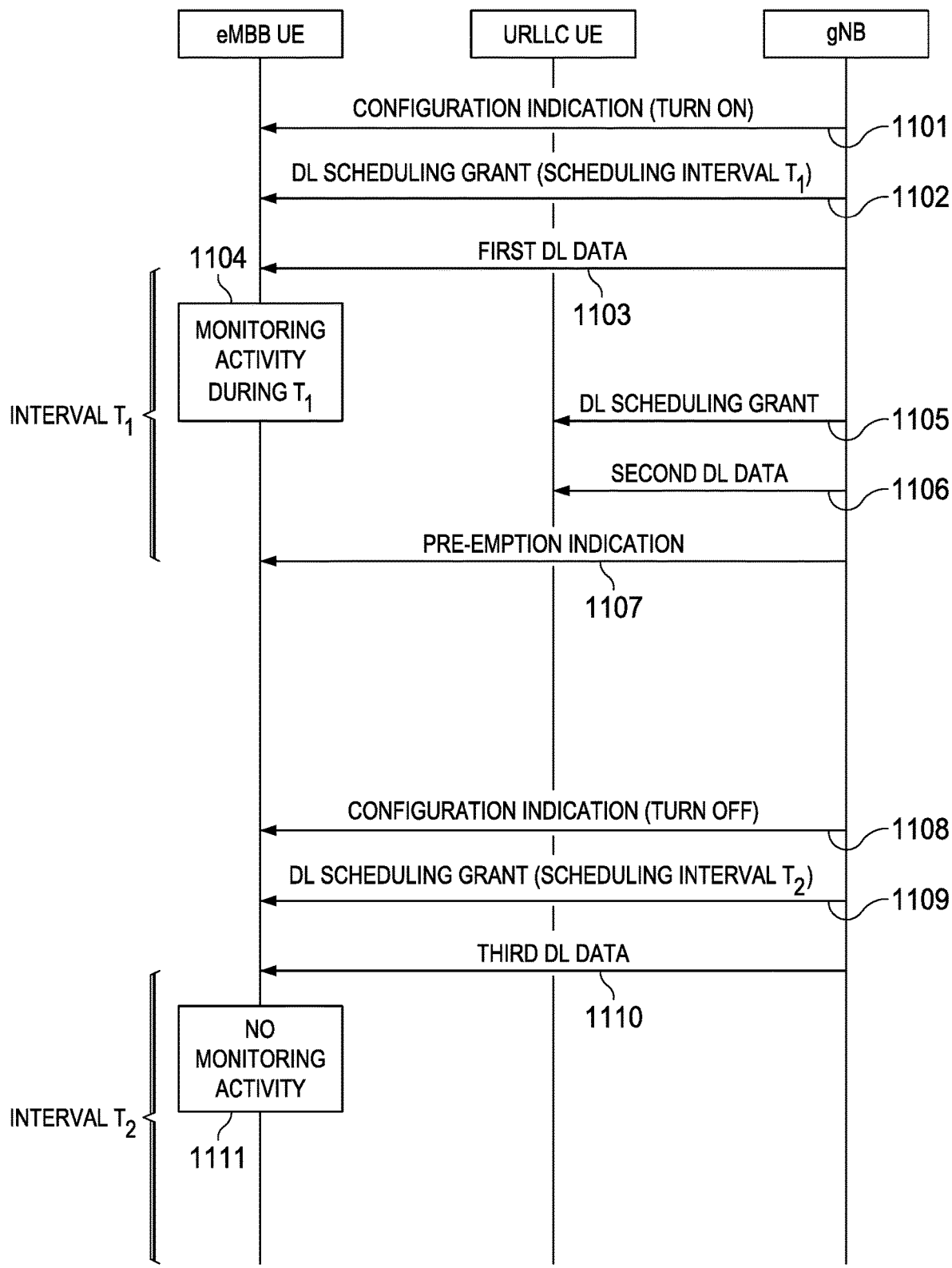
FIG. 11 illustrates an embodiment flow chart of a communication scheme with low latency traffic indication.

FIG. 11 illustrates an embodiment flow of a communication scheme using puncturing or pre-emption indicators to indicate to a latency tolerant UE the presence of second data (e.g. low latency data) intended for a low latency UE on resources scheduled for first data (e.g. latency tolerant data) intended for the latency tolerant UE. As shown in FIG. 11, a configuration indication is transmitted from a gNodeB (gNB)/eNB to a latency tolerant UE such as an eMBB UE in step 1101, e.g., prompting the eMBB UE to turn on or activate a monitoring function to monitor for pre-emption indicators that may indicate the presence of second data (e.g. low latency traffic) on resources identified in DL scheduling grants for the eMBB UE. At step 1102, the gNB may transmit a DL scheduling grant (e.g., for scheduling interval T1) to the eMBB UE, and at step 1103, the gNB may transmit first DL data (e.g., latency tolerant data) to the eMBB UE. The indicator/grant in steps 1101 and 1102 may be transmitted in different messages or in one message. The eMBB UE may monitor for pre-emption indicators during the scheduling interval T1 as shown in step 1104. At step 1105, the gNB may transmit a DL scheduling grant to a low latency UE such as a URLLC UE, and at step 1106, the gNB may transmit second DL data (e.g., low latency data) to the URLLC UE. At step 1107, a pre-emption indicator may be transmitted by the gNB to the eMBB UE to indicate the presence of second data (e.g. low latency traffic on resources identified in the DL scheduling grant transmitted at step 1103.

At step 1108, another configuration indicator is transmitted from the gNodeB to the eMBB UE, e.g., prompting the eMBB UE to turn off or deactivate the monitoring function for pre-emption indicators. At step 1109, the gNB may transmit a DL scheduling grant (e.g., for scheduling interval T2) to the eMBB UE, and at step 1110, the gNB may transmit third DL data (e.g., latency tolerant data) to the eMBB UE. The indicator/grant in steps 1108 and 1109 may be transmitted in different messages or in one message. Since the eMBB UE received the configuration indicator to turn off its monitoring function, the eMBB UE does not, during interval T2, monitor for pre-emption indicators as shown in step 1111.

Figure 12:
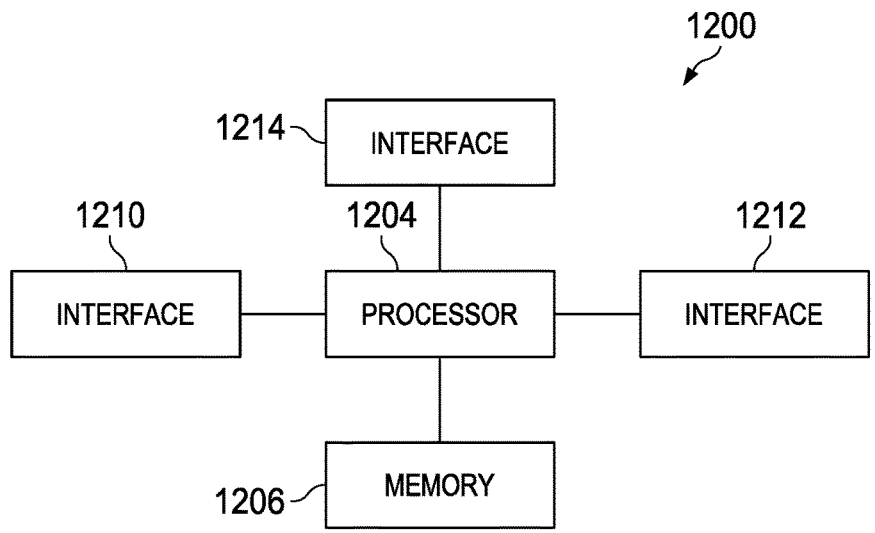
FIG. 12 illustrates a diagram of an embodiment processing system.
Figure 13:
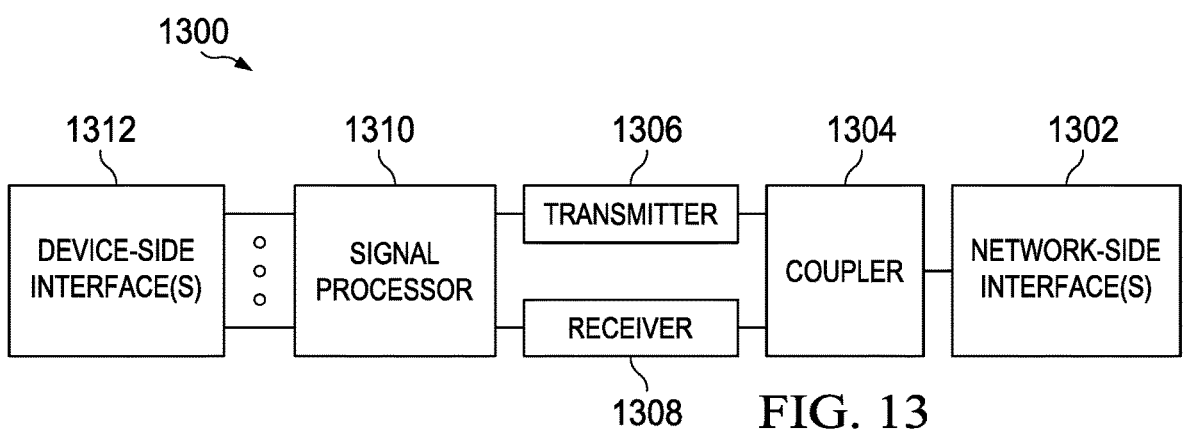
FIG. 13 illustrates a diagram of an embodiment transceiver.

FIG. 12 illustrates a block diagram of an embodiment processing system 1200 for performing methods described herein, which may be installed in a host device. As shown, the processing system 1200 includes a processor 1204, a memory 1206, and interfaces 1210-1214, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in FIG. 12, such as long term storage (e.g., non-volatile memory, etc.).

In some embodiments, the processing system 1200 is included in a network device that is accessing, or part otherwise of, a telecommunications network. In one example, the processing system 1200 is in a network-side device in a wireless or wireline telecommunications network, such as a base station, a relay station, a scheduler, a controller, a gateway, a router, an applications server, or any other device in the telecommunications network. In other embodiments, the processing system 1200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1210, 1212, 1214 connects the processing system 1200 to a transceiver adapted to transmit and receive signaling over the telecommunications network. FIG. 1=3 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In accordance with a further embodiment, a method for multiplexing traffic is provided, as may be performed by a base station. In this example, the method includes transmitting a latency tolerant transport block (TB) with a duration corresponding to a latency tolerant transmission time unit (TTU) and a low latency traffic transmission with a duration corresponding to a low latency transmission time unit (TTU). The low latency TB contains at least one mini-slot, and the low latency traffic transmission overlaps with the latency tolerant TB in the time-frequency domain. A mini-slot contains fewer symbols than a slot of the latency tolerant TB. The method further includes signaling control information of the low latency TB over one or more resource elements (REs). The signaling may be positioned in a data portion of the latency tolerant TB. Alternatively, the signaling may be positioned in a control portion of the latency tolerant TB or a control portion of the low latency TB. An apparatus for performing this method is also provided.

In accordance with yet another embodiment, a method for resource allocation in a wireless communications system is provided, as may be performed by a base station. In this example, the method includes dynamically remapping system bits and parity bits of latency tolerant traffic to resources in a latency tolerant TB. The method further includes transmitting the low latency data and the latency tolerant data. Although the embodiments here are shown for DL transmission, it is contemplated that similar scheme may also be applicable for UL transmission, if appropriate. An apparatus for performing this method is also provided.

In accordance with a yet another embodiment, a method for multiplexing traffic is provided, as may be performed by a base station. In this example, the method includes scheduling a first transmission of first data to a first user equipment (UE) on first resources, and transmitting second data to a second UE on at least a portion of the first resources. The method further includes signaling a first indicator to the first UE indicating that the first UE is to monitor for a second indicator, the second indicator indicating the presence of second data on the first resources. The method further includes signaling a second indicator to the first UE, the second indicator indicating the presence of the second data on the first resources. The BS may signal another first indicator to the first UE to indicate that the first UE is not to monitor for a second indicator when no second data is to be transmitted on the first resources. The first indicator may be signaled via Radio Resource Control (RRC) signaling. The first transmission may be scheduled in a coexistence region available for transmission of first and second data. And the first indicator may be transmitted to the first UE in a unicast transmission, a multicast transmission or a broadcast transmission. The second indicator indicates the portion of the first resources used to transmit the second data or a portion of the first transmission where the second data is present. The portion of the first transmission comprises one or more of a code block (CB), a transport block (TB), a group of CBs, or a group of TBs. The portion of the first resources comprises one or more of a time resource, a transmission time unit (TTU), a transmission time interval (TTI), a symbol, a frame, a sub-frame, a slot, a mini-slot, a frequency resource, a resource block (RB) or a resource block group (RBG) of the first resources. The second indicator comprises a bit indicating the presence of the second data on the portion of the first resources or the portion of the first transmission where the second data is present. The second indicator comprises a plurality of bits indicating the presence of the second data on the portion of the first resources or the portion of the first transmission where the second data is present. Each of the plurality of bits indicates the presence or absence of the second data on a respective resource of the first resources or on a respective portion of the first transmission. The plurality of bits correspond to at least one of a respective plurality of time resources, a respective plurality of frequency resources or a respective plurality of time-frequency resources of the portion of the first resources. The plurality of bits correspond to at least one of a respective plurality of CBs or a respective plurality of TBs of the first transmission. The second indicator is one of an explicit indication and an implicit indication. The second indicator is transmitted on the first resources or outside the first resources. Transmitting the second data on a portion of the first resources comprises puncturing the portion of the first transmission to transmit the second data, or reducing a power allocated for the portion of the first transmission to transmit the second data. An apparatus for performing this method is also provided. In accordance with yet another embodiment, a method for resource allocation in a wireless communications system is provided, as may be performed by a first user equipment (UE). In this example, the method includes receiving scheduling information from a base station (BS) for a first transmission of first data on first resources, and receiving a first indicator from a base station (BS) indicating that the first UE is to monitor for a second indicator, the second indicator indicating the presence of second data on the first resources transmitted to a second UE on at least a portion of the first resources. The method further includes receiving a second indicator from the BS, the second indicator indicating the presence of second data on the first resources, and decoding the first transmission based on the scheduling information and the first indicator. An apparatus for performing this method is also provided.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a signaling unit or a signaling module. Other steps described herein may be performed by a signaling unit/module, a scheduling unit/module, and/or a decoding unit/module (e.g. in a UE) and/or a monitoring unit/module. The respective units/modules may be hardware, software, or a combination thereof. For instance, one or more of the units/modules may be an integrated circuit, such as field programmable gate arrays (FPGAs) or application-specific integrated circuits (ASICs).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method performed by a first apparatus, the method comprising:

receiving a first indicator from a base station (BS) indicating that the first apparatus is to monitor a second indicator;
receiving scheduling information from the BS for a first transmission of first data on first resources;
receiving the second indicator from the BS, the second indicator indicating at least one group of code blocks (CBs) that is preempted by a second transmission, the at least one group of CBs being of the first transmission; and
decoding the first transmission of the first data.

2. The method of claim 1 further comprising monitoring the second indicator.

3. The method of claim 1 further comprising receiving a third indicator from the BS, the third indicator indicating that the first apparatus is not to monitor the second indicator when no second data is to be transmitted on the first resources.

4. The method of claim 1, wherein the first indicator is signaled via Radio Resource Control (RRC) signaling.

5. The method of claim 1 wherein the second indicator is received from the BS in a unicast transmission, a multicast transmission or a broadcast transmission.

6. The method of claim 1, wherein the second indicator comprises one or more bits indicating a portion of the first transmission that is preempted.

7. The method of claim 6, wherein the one or more bits correspond to at least one of a respective plurality of CBs of the first transmission.

8. The method of claim 1, wherein the second indicator is an explicit indication.

9. The method of claim 1, wherein the second indicator is transmitted outside the first resources.

10. The method of claim 1, wherein the first indicator specifies at least one of a time granularity and a frequency granularity used for content of the second indicator, time-frequency resources used for the content of the second indicator, time frequency resources used where the second indicator needs to be monitored, a type of the second indicator, or radio network temporary identifier (RNTI) information of a channel that contains the second indicator.

11. The method of claim 1, the second indicator indicating the at least one group of CBs of the first transmission used by a second apparatus.

12. The method of claim 1, the second indicator indicating the at least one group of CBs of the first transmission used for the second transmission of second data.

13. The method of claim 1, the decoding comprising decoding the first transmission of the first data according to the scheduling information, the first indicator, and the second indicator.

14. The method of claim 1, where in the first indicator specifies a monitoring interval, and the receiving the second indicator comprises receiving the second indicator within the monitoring interval.

15. A first apparatus configured for wireless communications, the first apparatus comprising:
a non-transitory memory storage comprising instructions; and
one or more processors in communication with the non-transitory memory storage, wherein the one or more processors execute the instructions to:
receive a first indicator from a base station (BS) indicating that the first apparatus is to monitor a second indicator;
receive scheduling information from the BS for a first transmission of first data on first resources;
receive the second indicator from the BS, the second indicator indicating at least one group of code blocks (CBs) that is preempted by a second transmission, the at least one group of CBs being of the first transmission; and
decode the first transmission of the first data.

16. The first apparatus of claim 15, wherein the one or more processors further execute the instructions to monitor the second indicator.

17. The first apparatus of claim 15, wherein the first indicator is signaled via Radio Resource Control (RRC) signaling.

18. The first apparatus of claim 15, wherein the second indicator is received from the BS in a unicast transmission, a multicast transmission or a broadcast transmission.

19. The first apparatus of claim 15, wherein the second indicator comprises one or more bits indicating a portion of the first transmission that is preempted.

20. The first apparatus of claim 19, wherein the one or more bits correspond to at least one of a respective plurality of CBs.

21. The first apparatus of claim 15, wherein the first indicator specifies at least one of a time granularity and a frequency granularity used for content of the second indicator, time-frequency resources used for the content of the second indicator, time frequency resources used where the second indicator needs to be monitored, a type of the second indicator, or radio network temporary identifier (RNTI) information of a channel that contains the second indicator.

22. The first apparatus of claim 15, the second indicator indicating the at least one group of CBs of the first transmission used by a second apparatus.

23. The first apparatus of claim 15, the second indicator indicating the at least one group of CBs of the first transmission used for the second transmission of second data.

24. The first apparatus of claim 15, the instructions to decode the first transmission of the first data comprising instructions to decode the first transmission of the first data according to the scheduling information, the first indicator, and the second indicator.

25. A method performed by a base station, the method comprising:
transmitting second data to a second user equipment (UE) on at least a portion of a first transmission of first data;
signaling a first indicator to a first UE indicating that the first UE is to monitor a second indicator;
sending scheduling information for the first transmission of the first data to the first UE on first resources; and
signaling the second indicator to the first UE, the second indicator indicating at least one group of code blocks (CBs) that is preempted by a second transmission, the at least one group of CBs being of the first transmission, wherein the first UE decodes the first transmission of the first data after the signaling the second indicator.

26. The method of claim 25, wherein the first indicator is signaled via Radio Resource Control (RRC) signaling.

27. The method of claim 25, wherein the second indicator is transmitted from the base station in a unicast transmission, a multicast transmission or a broadcast transmission.

28. The method of claim 25, wherein the second indicator comprises one or more bits indicating the at least a portion of the first transmission that is preempted.

29. The method of claim 28, wherein the one or more bits correspond to at least one of a respective plurality of CBs.

30. The method of claim 25, wherein the first indicator specifies at least one of a time granularity and a frequency granularity used for content of the second indicator, time-frequency resources used for the content of the second indicator, time frequency resources used where the second indicator needs to be monitored, a type of the second indicator, or radio network temporary identifier (RNTI) information of a channel that contains the second indicator.

31. The method of claim 25, the second indicator indicating the at least one group of CBs of the first transmission used by the second UE.

32. The method of claim 25, the second indicator indicating the at least one group of CBs of the first transmission used for the second transmission of the second data.

33. The method of claim 25, wherein the first UE decodes the first transmission of the first data according to the scheduling information, the first indicator, and the second indicator.

34. A base station configured for wireless communications, the base station comprising:
a non-transitory memory storage comprising instructions; and
one or more processors in communication with the non-transitory memory storage, wherein the one or more processors execute the instructions to:
transmit second data to a second user equipment (UE) on at least a portion of a first transmission of first data;
signal a first indicator to a first UE indicating that the first UE is to monitor a second indicator;
send scheduling information for the first transmission of the first data to the first UE on first resources; and
signaling the second indicator to the first UE, the second indicator indicating at least one group of code blocks (CBs) that is preempted by a second transmission, the at least one group of CBs being of the first transmission, wherein the first UE decodes the first transmission of the first data after the second indicator is signaled to the first UE.

35. The base station of claim 34, wherein the first indicator is signaled via Radio Resource Control (RRC) signaling.

36. The base station of claim 34, wherein the second indicator is transmitted from the base station in a unicast transmission, a multicast transmission or a broadcast transmission.

37. The base station of claim 34, wherein the second indicator comprises one or more bits indicating the at least a portion of the first transmission that is preempted.

38. The base station of claim 37, wherein the one or more bits correspond to at least one of a respective plurality of CBs.

39. The base station of claim 34, wherein the first indicator specifies at least one of a time granularity and a frequency granularity used for content of the second indicator, time-frequency resources used for the content of the second indicator, time frequency resources used where the second indicator needs to be monitored, a type of the second indicator, or radio network temporary identifier (RNTI) information of a channel that contains the second indicator.

40. The base station of claim 34, the second indicator indicating the at least one group of CBs of the first transmission used by the second UE.

41. The base station of claim 34, the second indicator indicating the at least one group of CBs of the first transmission used for the second transmission of the second data.

42. The base station of claim 34, wherein the first UE decodes the first transmission of the first data according to the scheduling information, the first indicator, and the second indicator.

* * * * *